(12) United States Patent
Treadway et al.

(10) Patent No.: US 11,685,527 B2
(45) Date of Patent: Jun. 27, 2023

(54) PROJECTILE DELIVERY SYSTEMS AND WEAPONIZED AERIAL VEHICLES AND METHODS INCLUDING SAME

(71) Applicant: Corvid Technologies LLC, Mooresville, NC (US)

(72) Inventors: Sean Kevin Treadway, Mooresville, NC (US); Michael John Worsham, Mooresville, NC (US)

(73) Assignee: Corvid Technologies LLC, Mooresville, NC (US)

( * ) Notice: Subject to any disclaimer, the term of this patent is extended or adjusted under 35 U.S.C. 154(b) by 8 days.

(21) Appl. No.: 17/544,305

(22) Filed: Dec. 7, 2021

(65) Prior Publication Data
US 2022/0363386 A1 Nov. 17, 2022

Related U.S. Application Data

(60) Provisional application No. 63/127,703, filed on Dec. 18, 2020.

(51) Int. Cl.
*B64D 1/04* (2006.01)
*F42B 10/64* (2006.01)
(Continued)

(52) U.S. Cl.
CPC .............. *B64D 1/04* (2013.01); *B64C 39/024* (2013.01); *F41G 9/02* (2013.01); *F42B 10/64* (2013.01); *G05D 1/12* (2013.01); *B64U 2101/15* (2023.01)

(58) Field of Classification Search
CPC ... F42B 10/64; F41G 9/02; F41F 3/065; F41F 15/00
(Continued)

(56) References Cited

U.S. PATENT DOCUMENTS 2,397,088 A * 3/1946 Clay .................. F41G 9/02
89/1.51
5,779,190 A 7/1998 Rambo et al.
(Continued)

FOREIGN PATENT DOCUMENTS

DE    102010010508 B4   11/2013
WO      2017027836 A1    2/2017
WO      2018111282 A1    6/2018

*Primary Examiner* — Bret Hayes
(74) *Attorney, Agent, or Firm* — Myers Bigel, P.A.

(57) ABSTRACT

A projectile delivery module to be mounted on an aerial vehicle includes a projectile delivery system including a kinetic projectile and a base system. The kinetic projectile includes a projectile body, an RF receiver, and an onboard steering system including: a steering mechanism operable to change an attitude, orientation, and/or direction of flight of the kinetic projectile; and a steering actuator. The base system includes: an RF transmitter to communicate with the RF receiver; a projectile holder; a target tracking system; and a projectile guidance system including a projectile tracking system and a projectile control system. The base system is configured to: release the kinetic projectile from the projectile holder such that the kinetic projectile is driven toward a target by gravity; track the target using the target tracking system; track the released kinetic projectile using the projectile tracking system; and automatically control the onboard steering system using the projectile control system to adjust a trajectory of the falling kinetic projectile to steer the kinetic projectile to the target.

37 Claims, 18 Drawing Sheets

(51) Int. Cl.
  *G05D 1/12*  (2006.01)
  *F41G 9/02*  (2006.01)
  *B64C 39/02*  (2023.01)
  *B64U 101/15* (2023.01)

(58) Field of Classification Search
  USPC .................. 89/1.51, 1.54, 1.56, 1.58, 1.59
  See application file for complete search history.

(56) References Cited

U.S. PATENT DOCUMENTS

| | | | |
|---|---|---|---|
| 5,834,684 A * | 11/1998 | Taylor | F42B 12/16 |
| | | | 244/3.28 |
| 6,056,237 A | 5/2000 | Woodland | |
| 7,610,841 B2 | 11/2009 | Padan | |
| 7,690,304 B2 * | 4/2010 | Roemerman | F42C 15/005 |
| | | | 89/1.55 |
| 8,661,980 B1 * | 3/2014 | Roemerman | F42B 33/001 |
| | | | 102/489 |
| 8,708,285 B1 | 4/2014 | Carreiro | |
| 9,085,362 B1 | 7/2015 | Kilian et al. | |
| 9,121,669 B1 * | 9/2015 | Hyslop | F41G 7/2293 |
| 9,127,908 B2 | 9/2015 | Miralles | |
| 9,434,471 B2 | 9/2016 | Arlton et al. | |
| 2010/0198514 A1 * | 8/2010 | Miralles | B64C 39/024 |
| | | | 701/302 |
| 2010/0258672 A1 | 10/2010 | Grabmeier et al. | |
| 2012/0061508 A1 | 3/2012 | De et al. | |
| 2012/0210853 A1 | 8/2012 | Abershitz et al. | |
| 2016/0048129 A1 * | 2/2016 | Kolanek | G05D 1/0022 |
| | | | 701/2 |
| 2018/0362157 A1 | 12/2018 | Teetzel | |

\* cited by examiner

PROJECTILE DELIVERY SYSTEMS AND WEAPONIZED AERIAL VEHICLES AND METHODS INCLUDING SAME

RELATED APPLICATION(S)

The present application claims the benefit of and priority from U.S. Provisional Patent Application No. 63/127,703, filed Dec. 18, 2020, the disclosure of which is incorporated herein by reference in its entirety.

FIELD

The present invention relates to weapons and, more particularly, to weapons deployed from aerial vehicles and weaponized aerial vehicles including same.

BACKGROUND

Aerial vehicles are commonly used to deploy weapons such as bombs and rockets against targets.

SUMMARY OF THE INVENTION

According to some embodiments, a projectile delivery module for use with an aerial vehicle includes a projectile delivery system including a kinetic projectile and a base system. The kinetic projectile includes a projectile body, an onboard steering system, and a radio-frequency (RF) receiver. The onboard steering system includes: a steering mechanism operable to change an attitude, orientation, and/or direction of flight of the kinetic projectile; and a steering actuator operable to control the steering mechanism. The base system includes: an RF transmitter to communicate with the RF receiver of the kinetic projectile; a projectile holder configured to secure the kinetic projectile to the aerial vehicle and configured to selectively release the kinetic projectile; a target tracking system; and a projectile guidance system including a projectile tracking system and a projectile control system. The projectile delivery module is configured to be mounted on the aerial vehicle for flight therewith. The base system is configured to: release the kinetic projectile from the projectile holder such that the kinetic projectile is driven toward a target by gravity; track the target using the target tracking system; track the released kinetic projectile using the projectile tracking system; and automatically control the onboard steering system of the kinetic projectile using the projectile control system to adjust a trajectory of the falling kinetic projectile to steer the kinetic projectile to the target.

According to some embodiments, the kinetic projectile does not include or carry explosive material or incendiary material.

According to some embodiments, the released kinetic projectile is driven downward only by gravity.

According to some embodiments, the kinetic projectile does not include or carry an onboard propulsion mechanism.

According to some embodiments, the kinetic projectile does not include or carry an onboard target tracking system.

According to some embodiments, the kinetic projectile does not include or carry an onboard projectile guidance system.

According to some embodiments, the kinetic projectile does not include or carry a GPS signal receiver.

In some embodiments, the kinetic projectile delivery system includes a plurality of the kinetic projectiles.

In some embodiments, the base system is operable to release a plurality of the kinetic projectiles in a salvo directed at the target.

According to some embodiments, the projectile body is elongate.

In some embodiments, the projectile body has a length:width ratio in the range of from about 8 to 15.

In some embodiments, the projectile body has a length in the range of from about 10 to 16 inches long, and a mass in the range of from about 70 to 350 grams without a payload.

In some embodiments, the projectile body has a leading end that is tapered to pierce the target.

According to some embodiments, the projectile body includes a polymeric component and a metal nose.

According to some embodiments, the projectile steering mechanism includes an adjustable aerodynamic control surface.

In some embodiments, the adjustable aerodynamic control surface is a movable fin or canard.

In some embodiments, the projectile steering actuator includes a motor operable to move the aerodynamic control surface.

According to some embodiments, the kinetic projectile includes a self-designation feature, and the projectile tracking system uses the self-designation feature to track the released projectile in flight.

In some embodiments, the self-designation feature is an infrared light emitter, a blue light (400 to 480 nm) emitter, or a UV (240 to 400 nm) emitter.

According to some embodiments, the projectile delivery system controls the flight of the released projectile using one-way communication between the base system and the kinetic projectile, wherein: the base system sends steering commands to the kinetic projectile; and the kinetic projectile does not send signals to the base system.

According to some embodiments, the projectile delivery system controls the flight of the released projectile using two-way communication between the base system and the kinetic projectile, wherein: the base system sends steering commands to the kinetic projectile; and the kinetic projectile sends projectile status data to the base system to incorporate into projectile tracking and guidance processing by the base system.

In some embodiments, the projectile status data includes at least one of: a magnetometer-based heading reading; an airspeed of the projectile; an altitude of the projectile; an attitude of the kinetic projectile; an orientation of the kinetic projectile; and a rate of rotation of the kinetic projectile about each of a roll axis, a pitch axis, and a yaw axis.

In some embodiments, the kinetic projectile includes an onboard projectile state sensor that acquires the projectile status data instantaneously.

According to some embodiments, the weaponized aerial vehicle is configured such that: the aerial vehicle is automatically placed in a tracking/guidance mode when the kinetic projectile is released and in flight; and in the tracking/guidance mode, flight of the aerial vehicle is controlled to optimize guidance of the kinetic projectile.

In some embodiments, the projectile tracking system includes a camera to track the inflight projectile, and the camera is secured to the aerial vehicle without a gimbal when the projectile delivery module is mounted on the aerial vehicle.

In some embodiments, the kinetic projectile includes an environmental sensor on the projectile body.

The environmental sensor may include at least one of a microphone and a camera.

According to some embodiments, the projectile delivery system is configured to: receive a target designation from an operator; and thereafter automatically execute the tracking of the target and the tracking and guidance of the kinetic projectile using the base system onboard the aerial vehicle.

According to some embodiments, the projectile delivery system is configured to: receive a target designation from an operator; receive a designation of an abort zone from the operator; and guide the released kinetic projectile to the abort zone in response to a command to abort the attack.

According to some embodiments, the projectile delivery system is configured to: receive a target designation from an operator; receive a designation of a keep out zone from the operator; and prevent the kinetic projectile from landing in the keep out zone.

According to some embodiments, the base system includes a camera to be mounted on the aerial vehicle, and the target tracking system is configured to: acquire image data from the camera; and track the target using computer vision.

In some embodiments, the projectile guidance system is configured to: receive a bounding box designation from an operator; and control the onboard steering system of the kinetic projectile to adjust a trajectory of the falling projectile to steer the kinetic projectile into a space designated by the bounding box.

In some embodiments, the base system is configured to communicate with a remote operator terminal to report projectile tracking data relative to a location of the target and/or a designated zone.

In some embodiments, the base system is configured to communicate with a remote operator terminal to report projectile tracking data relative to a location of the target and relative to at least one of a designated abort zone and a designated keep out zone.

According to some embodiments, the kinetic projectile includes an energetic payload.

According to some embodiments, a weaponized aerial vehicle includes an aerial vehicle and a projectile delivery system mounted on the aerial vehicle for flight therewith. The projectile delivery system includes a kinetic projectile and a base system. The kinetic projectile includes a projectile body and an onboard steering system. The onboard steering system includes: a steering mechanism operable to change an attitude, orientation, and/or direction of flight of the kinetic projectile; and a steering actuator operable to control the steering mechanism. The base system includes: a projectile holder securing the kinetic projectile to the aerial vehicle and configured to selectively release the kinetic projectile; a target tracking system; and a projectile guidance system including a projectile tracking system and a projectile control system. The base system is configured to: release the kinetic projectile from the projectile holder such that the kinetic projectile is driven toward a target by gravity; track the target using the target tracking system; track the released kinetic projectile using the projectile tracking system; and automatically control the onboard steering system of the kinetic projectile using the projectile control system to adjust a trajectory of the falling kinetic projectile to steer the kinetic projectile to the target.

According to some method embodiments, a method for damaging a target includes providing a weaponized aerial vehicle including an aerial vehicle and a projectile delivery system mounted on the aerial vehicle for flight therewith. The projectile delivery system includes a kinetic projectile and a base system. The kinetic projectile includes a projectile body and an onboard steering system. The onboard steering system includes: a steering mechanism operable to change an attitude, orientation, and/or direction of flight of the kinetic projectile; and a steering actuator operable to control the steering mechanism. The base system includes: a projectile holder securing the kinetic projectile to the aerial vehicle and configured to selectively release the kinetic projectile; a target tracking system; and a projectile guidance system including a projectile tracking system and a projectile control system. The method further includes using the base system to: release the kinetic projectile from the projectile holder such that the kinetic projectile is driven toward a target by gravity; track the target using the target tracking system; track the released kinetic projectile using the projectile tracking system; and automatically control the onboard steering system of the kinetic projectile using the projectile control system to adjust a trajectory of the falling kinetic projectile to steer the kinetic projectile to the target.

According to some method embodiments, a method for sensing an environmental condition includes providing a sensor-equipped aerial vehicle including an aerial vehicle and a projectile delivery system mounted on the aerial vehicle for flight therewith. The projectile delivery system includes a projectile and a base system. The projectile includes a projectile body, an onboard steering system, and an onboard environmental sensor. The onboard steering system includes: a steering mechanism operable to change an attitude, orientation, and/or direction of flight of the kinetic projectile; and a steering actuator operable to control the steering mechanism. The base system includes: a projectile holder securing the projectile to the aerial vehicle and configured to selectively release the projectile; a target location tracking system; and a projectile guidance system including a projectile tracking system and a projectile control system. The method further includes using the base system to: release the projectile from the projectile holder such that the projectile is driven toward a target location by gravity; track the target location using the target tracking system; track the released projectile using the projectile tracking system; and automatically control the onboard steering system of the projectile using the projectile control system to adjust a trajectory of the falling projectile to steer the projectile to the target location. The method further includes using the onboard environmental sensor to sense an environmental condition at the target location.

In some embodiments, the method includes: recording, on the projectile, data acquired from the environmental sensor at the target location; and/or transmitting, from the projectile, data acquired from the environmental sensor at the target location.

DESCRIPTION

Figure 1:
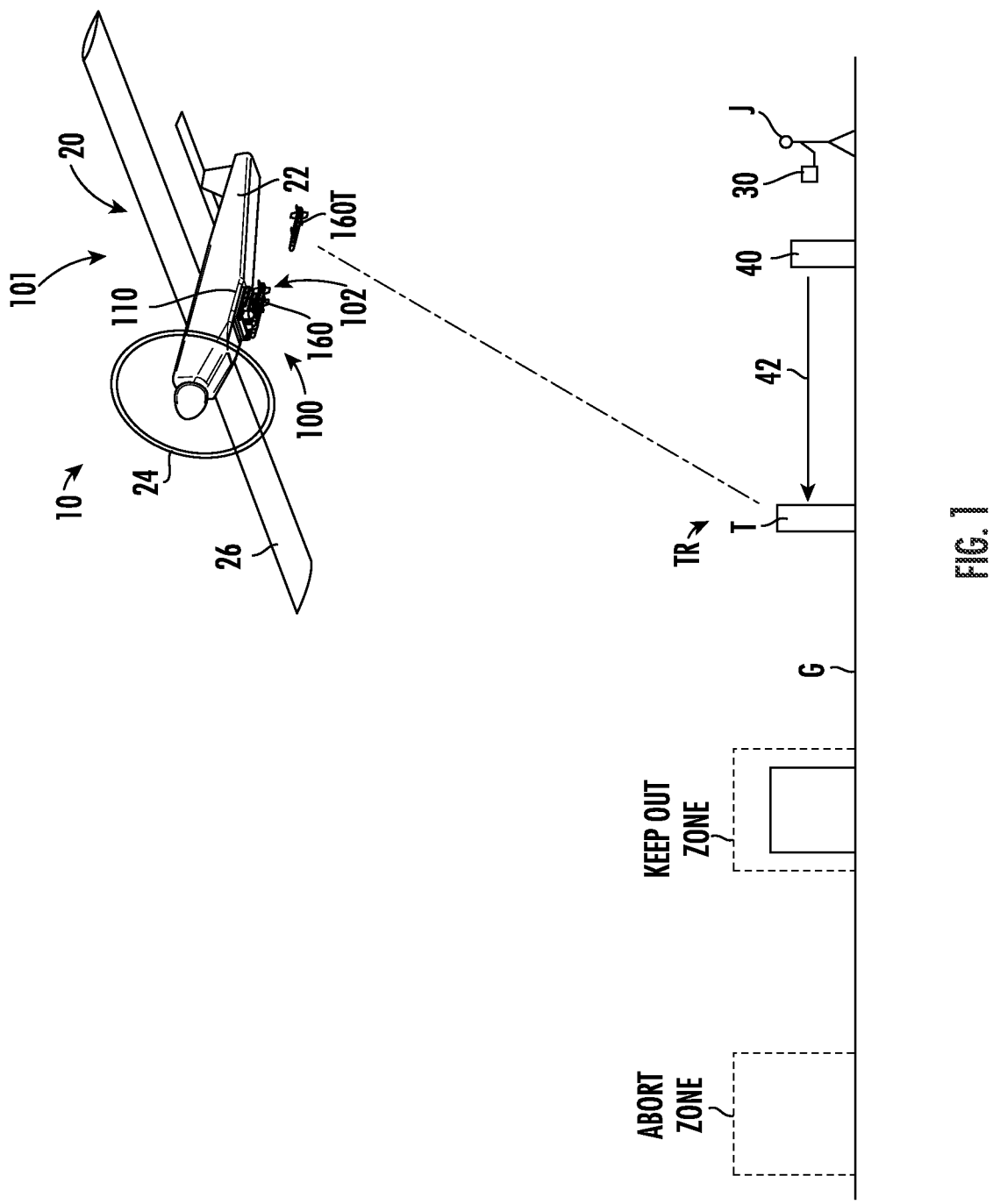
FIG. 1 is a schematic view of a weapon system according to some embodiments along with a target and an operator, wherein the weapon system includes a weaponized aerial vehicle, and wherein the weaponized aerial vehicle includes an aerial vehicle and a projectile delivery module according to some embodiments of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams.

The term "automatically" means that the operation is substantially, and may be entirely, carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

With reference to FIGS. 1-10, a weapon system 10 (FIG. 1) according to some embodiments is shown therein. The weapon system 10 includes a projectile delivery system 100 according to some embodiments, the weapon system 10 includes an aerial vehicle 20 as a launch platform. The projectile delivery system 100 is mounted on the aerial vehicle 20 for flight therewith. The projectile delivery system 100 and the aerial vehicle 20 together form a weaponized aerial vehicle 101. The projectile delivery system 100 includes a base system 110 and a plurality of kinetic projectiles 160 mounted on the base system 110. In use, the system 10 and weaponized aerial vehicle 101 are operated to attack and inflict damage on a target T below the weaponized aerial vehicle 101 on or proximate the ground G. More particularly, the projectile delivery system 100 is operated to drop and guide one or more of the projectiles 160 onto the target T. Each projectile 160 can thus serve as a gravity-driven, guided kinetic kill projectile and, in particular, may be a precision-guided kinetic kill projectile. The target T may be ground-based. The target may include one or more personnel and/or materiel.

In some embodiments, the weapon system 10 also includes a remote control station 30 that may be used by an operator J to monitor and/or control some operation of the projectile delivery system 100. In some embodiments, the target T is selected by a human operator (hereinafter, "the operator") and tracked by computer vision executed on the base system 110.

In some embodiments, the weapon system 10 also includes a designation laser source 40 operable to generate a laser beam 42 onto or proximate the target T to assist in guiding the projectile(s) 160, as discussed below.

In some embodiments, the aerial vehicle 20 is an unmanned aerial vehicle (UAV) and the aerial vehicle 101 is a weaponized unmanned aerial vehicle. However, in other embodiments, the aerial vehicle may be manned aerial vehicle. In some embodiments, the weaponized aerial vehicle 101 is relatively small (e.g., less than two meters in the largest plan dimension) so that the weaponized aerial vehicle 101 is difficult to detect below a cloud deck. In some embodiments, when deploying projectile delivery system 100 the weaponized aerial vehicle may reduce the speed of its engines/motors, or may stop its engines/motors entirely, to avoid audible detection below the cloud deck.

The illustrated aerial vehicle 20 (FIGS. 1-4) includes a body or chassis 22, a propulsion system 24 (e.g., a motor driven rotor), wings 26, and an onboard power supply (e.g., battery). However, it will be appreciated that any suitable aerial vehicle may be used.

Figure 2:
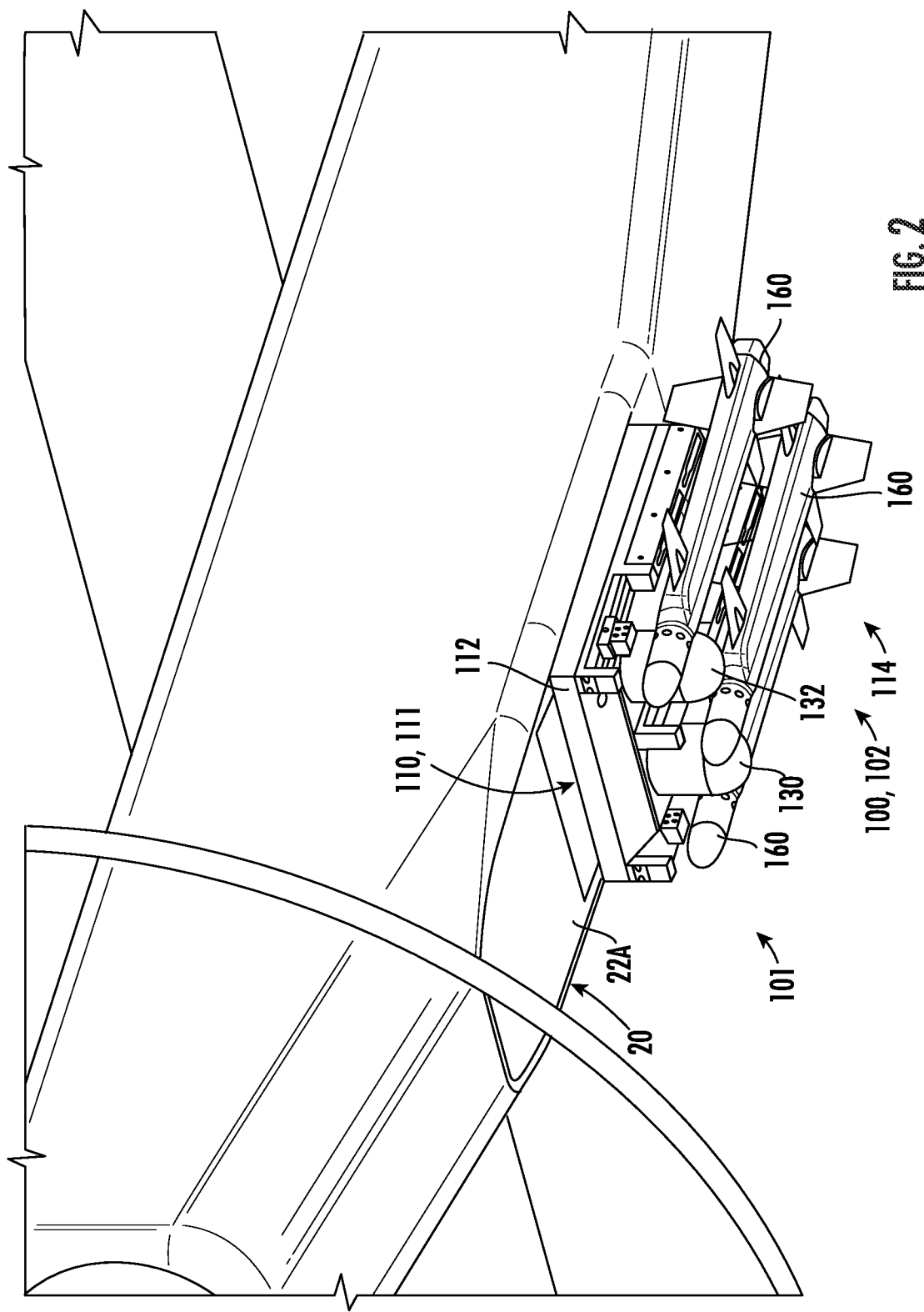
FIG. 2 is an enlarged, fragmentary, bottom perspective view of the weaponized aerial vehicle of FIG. 1.
Figure 3:
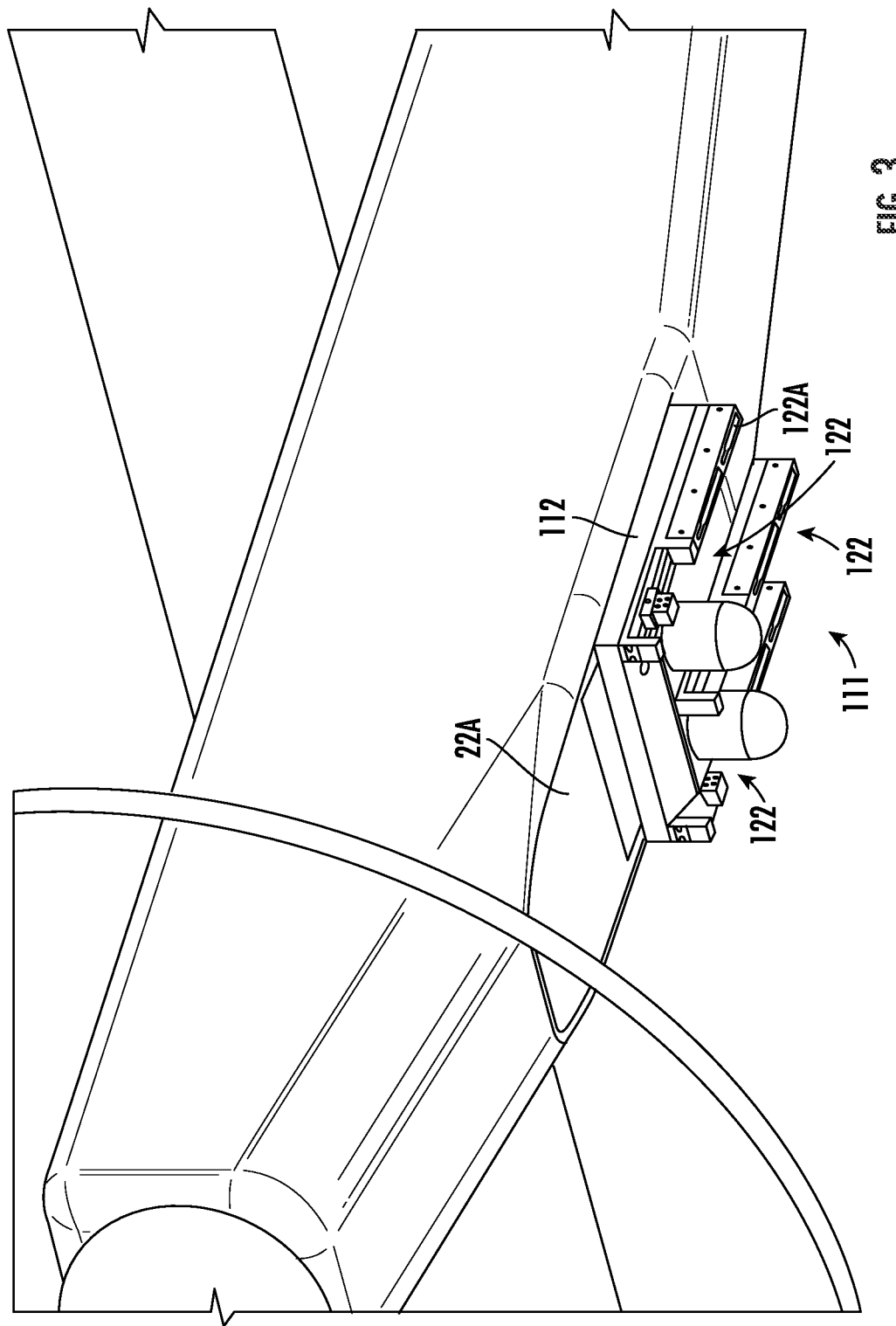
FIG. 3 is an enlarged, fragmentary, bottom perspective view of the weaponized aerial vehicle of FIG. 1, wherein the projectile delivery module is shown without kinetic projectiles forming a part thereof.
Figure 4:
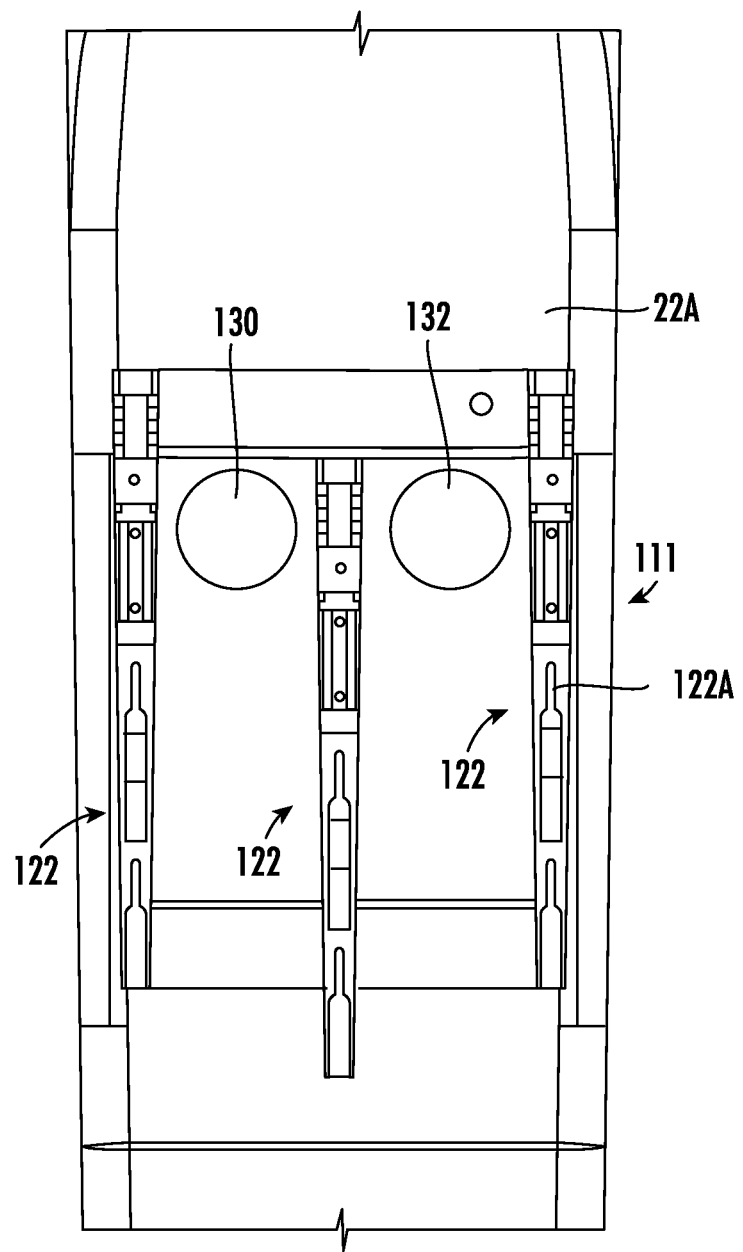
FIG. 4 is an enlarged, fragmentary, bottom plan view of the weaponized aerial vehicle of FIG. 1, wherein the projectile delivery module is shown without the kinetic projectiles.
Figure 5:
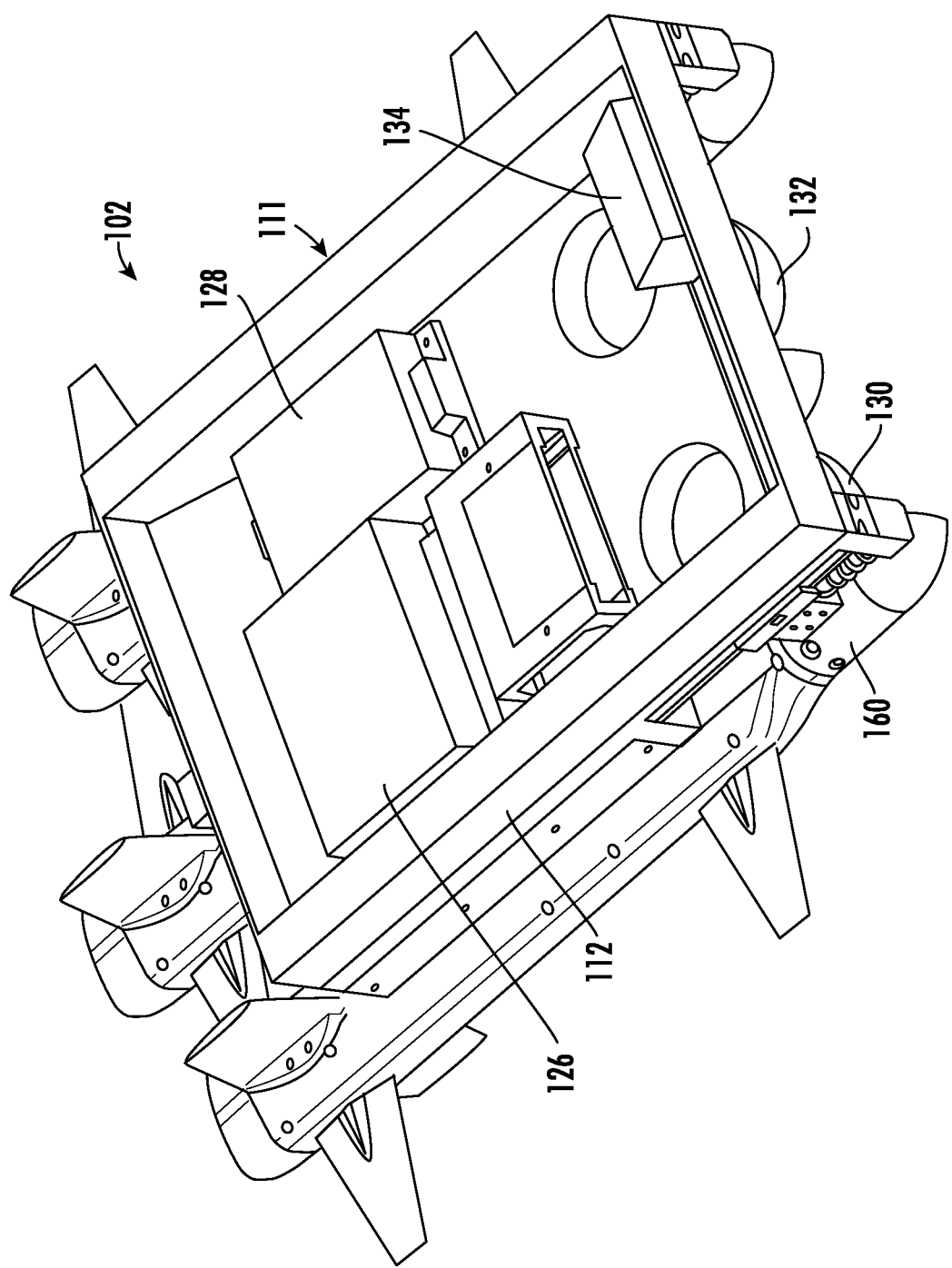
FIG. 5 is a top perspective view of the projectile delivery module of FIG. 1.
Figure 6:
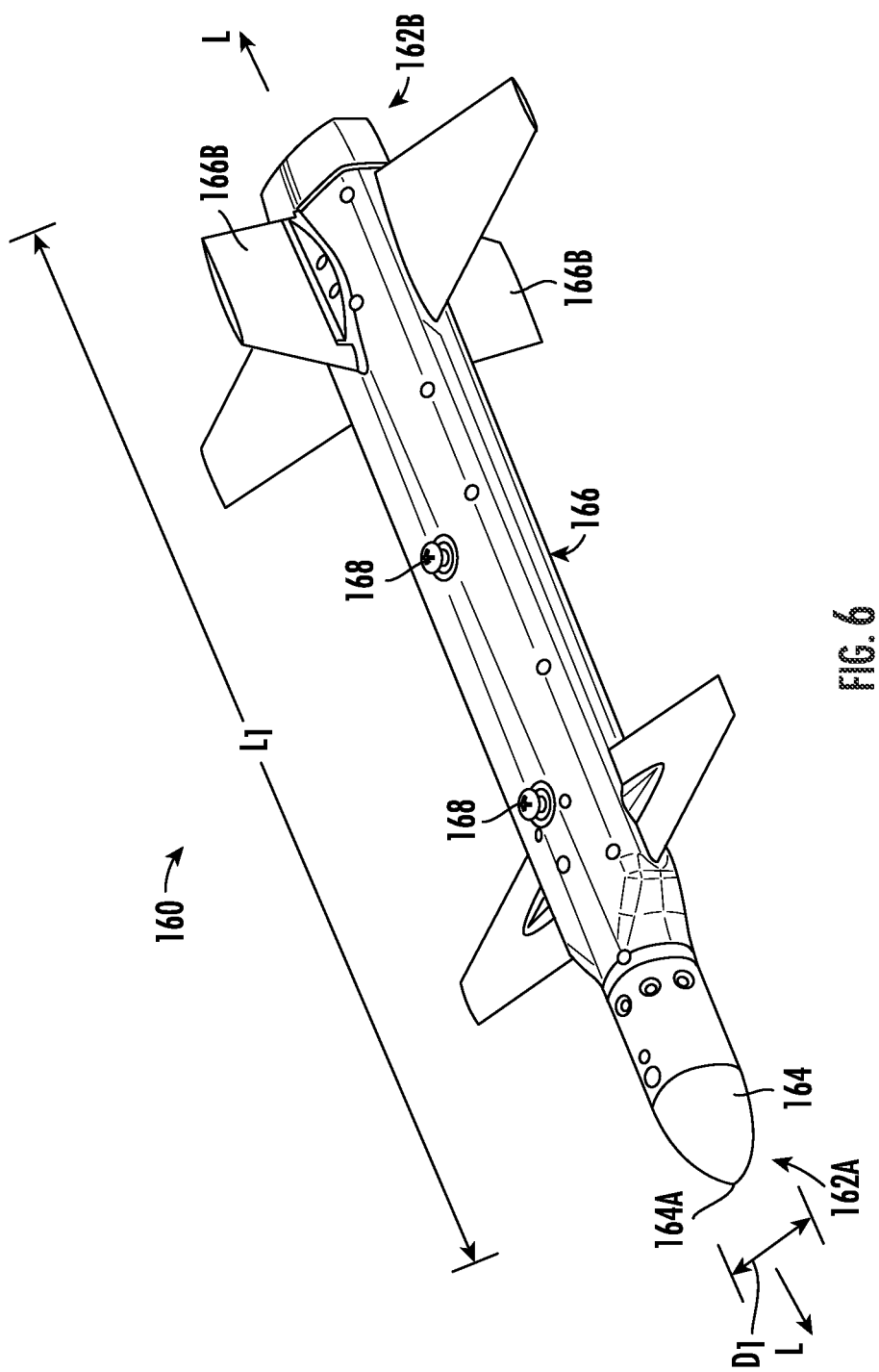
FIG. 6 is a top perspective view of one of the kinetic projectiles forming a part of the projectile delivery module of FIG. 1.
Figure 7:
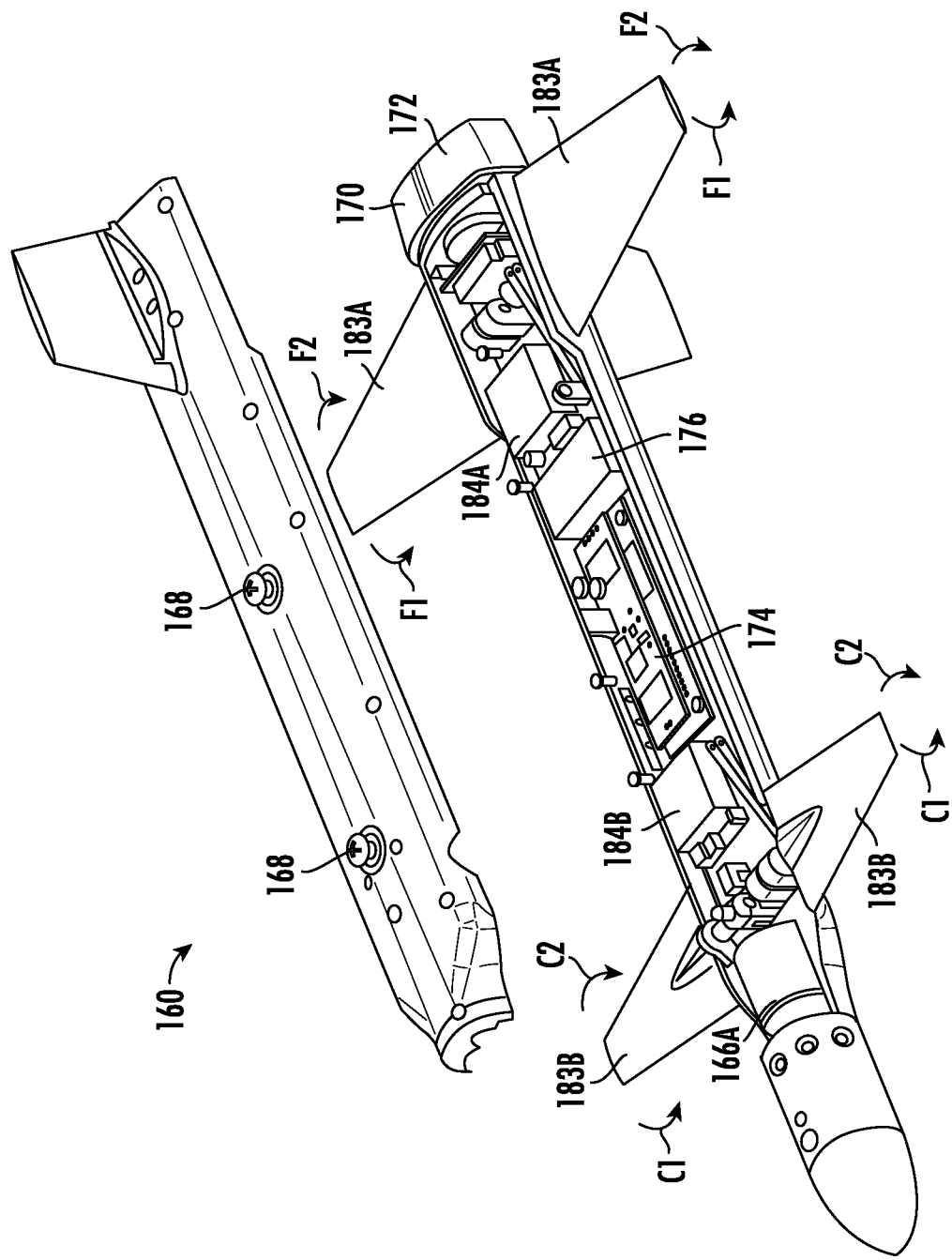
FIG. 7 is an exploded, top perspective view of the kinetic projectile of FIG. 6.

The projectile delivery system 100 is embodied in a projectile delivery module 102 (FIG. 2) mounted on the aerial vehicle 20. With reference to FIG. 2, the projectile delivery module 102 includes a base module 111, (secured to the belly 22A of the aerial vehicle 20), and the projectiles 160 secured to the base module 111. In some embodiments, all the components of the base system 110 are embodied in the base module 111. The projectile delivery module 102 may take the form of pod or assembly that can be readily integrated with a chosen aerial vehicle as launch platform.

The base system 110 includes a frame or housing 112, a plurality of projectile holders 120, and an operational control system 114.

Each projectile holder 120 includes a slot or seat 122 (FIGS. 3 and 4) configured to releasably receive or hold one of the kinetic projectiles 160.

Figure 8:
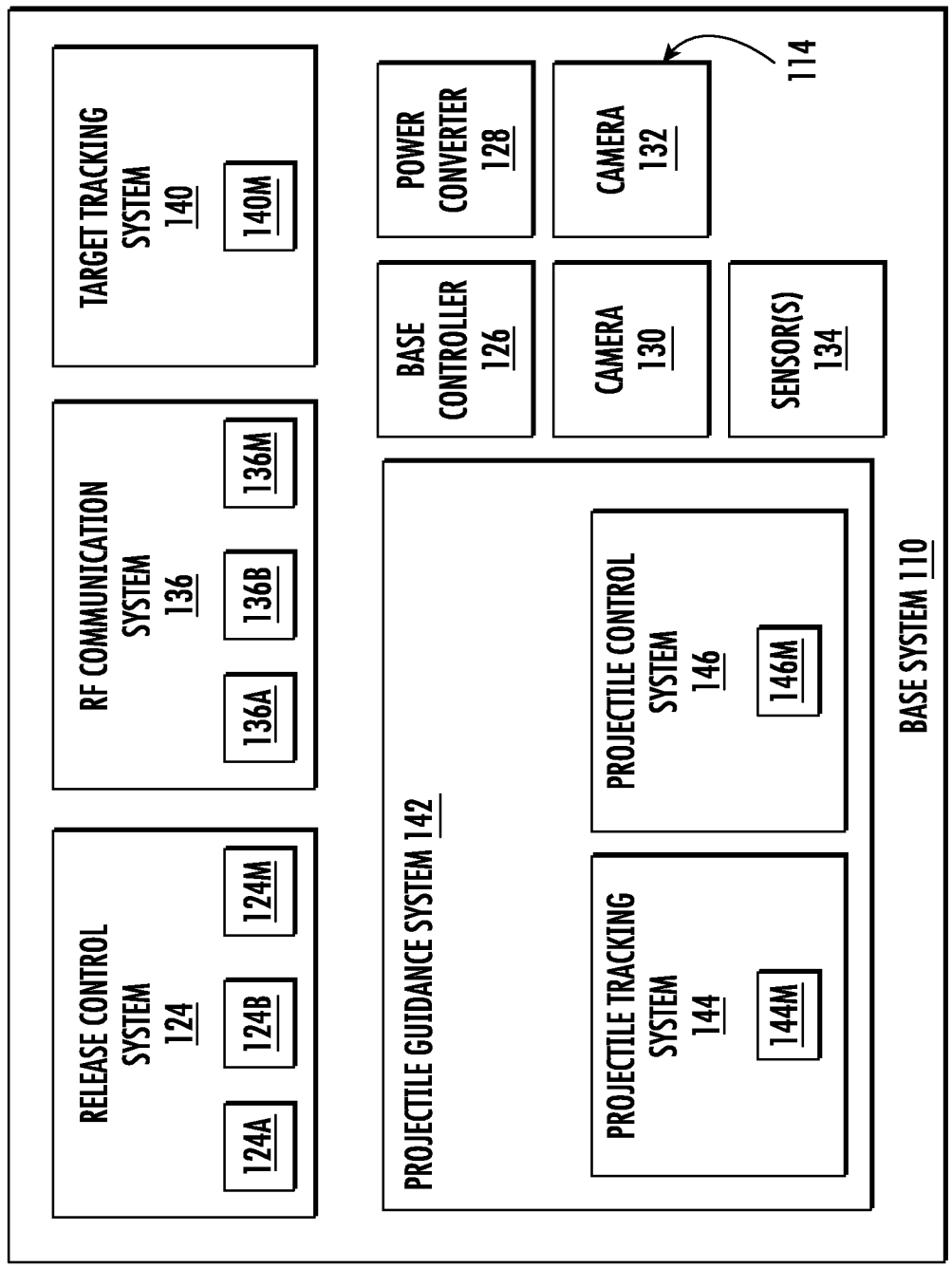
FIG. 8 is a schematic view representing a base system forming a part of the projectile delivery module of FIG. 1.
Figure 9:
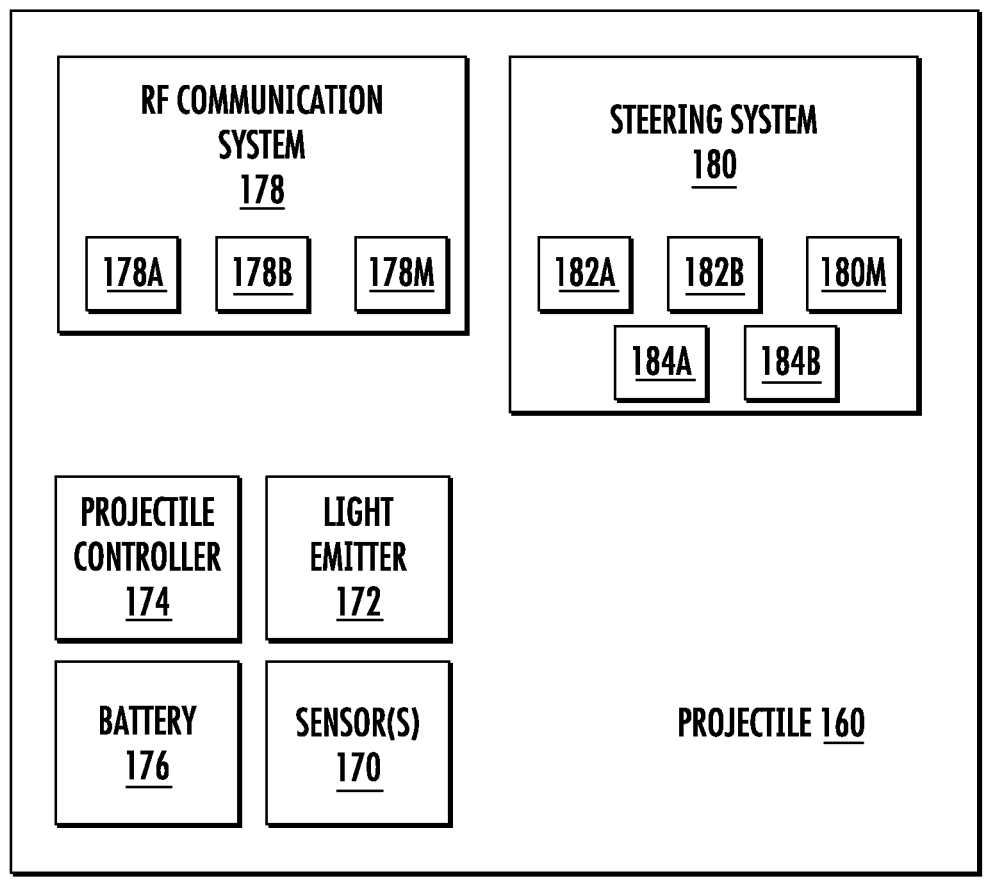
FIG. 9 is a schematic view representing one of the kinetic projectiles forming a part of the projectile delivery module of FIG. 1.

FIG. 8 is a schematic representation of the operational control system 114. The operational control system 114 includes a base controller 126, a power converter 128, a first camera 130, a second camera 132, one or more environmental sensors 134, a projectile release control system 124, a radio-frequency (RF) communication system 136, a target tracking system 140, and a projectile guidance system 142.

The base controller 126 may be any suitable device or processor, such as a microprocessor-based computing device. The functionality of the base controller 126 may be distributed across or embodied in one or more controllers forming a part of the base module 111. The modules 124M, 136M, 140M, 144M, and 146M discussed below are computer program code modules that may be embodied in software and/or firmware as discussed below. The modules 124M, 136M, 140M, 144M, and 146M may be embodied in the base controller 126, for example.

The onboard power converter 128 may be electrically connected to the aerial vehicle 20 to supply operational power from the aerial vehicle to the base system 110. In some embodiments, the base module 111 may include an onboard battery in addition to or in place of the power supply from the aerial vehicle 20.

The cameras 130, 132 may be any suitable cameras for executing the functions described herein. In some embodiments, the camera 130 is a wide-field camera and the camera 132 is a near-field camera. The cameras 130, 132 may have sensitivity to visible light, infrared (IR), or other light frequencies. In some embodiments, the cameras 130, 132 are compact digital cameras (e.g. FLIR Grasshopper) having electronic sensor elements (e.g. CMOS, CCD) with a pixel count adequate to resolve targets and engagement scenes for the purpose of recognition of features by both the human eye and by computer vision systems. The camera optics may be designed to match the function of a given camera and may have magnification sufficient to deliver appropriate imaging to the camera's sensor elements. The camera may output image information in a range of formats, including video formats (e.g. AVCHD) or a series of individual images (e.g. RAW, TIFF). Camera images are input to processing units on the base controller 126 and may be relayed as necessary to remote users 30.

The environmental sensor(s) 134 may include an inertial sensor, for example.

The projectile release control system 124 includes a release mechanism 124A associated with each seat 122, a release actuator 124B, and a release control module 124M. In use, the release control module 124M signals the release actuator 124B to operate a selected release mechanism 124A to release the corresponding projectile 160 from its seat 122.

The base radiofrequency (RF) communication system 136 includes an RF communication module 136M, an RF radio emitter or transmitter 136A, and an RF radio receiver. In some embodiments, the RF transmitter 136A and the RF transceiver 136B are combined in an RF transceiver.

The target tracking system 140 includes a target tracking module 140M.

The projectile guidance system 142 includes a projectile tracking system 144 and a projectile control system 146. The projectile tracking system 144 includes a projectile tracking module 144M. The projectile control system 146 includes a projectile control module 146M.

In some embodiments, the number of projectiles 160 mounted on the base module 111 in the range of from about 1 to 3 and, in some embodiments, is in the range of from about 8 to 24.

The projectiles 160 (FIGS. 6 and 7) may be constructed substantially the same as one another or differently. In the illustrated embodiment, the projectiles 160 are substantially identical. One of the projectiles 160 will be described hereinbelow, and it will be understood that this description likewise applies to the other projectiles 160.

The projectile 160 has a lengthwise axis L-L, a leading end 162A, and an axially opposed tail end 162B. The projectile 160 includes an axially extending body 166 and a nose section 164. The projectile 160 may be formed in any suitable shape. In some embodiments, the projectile 160 is shaped as an elongate member (e.g., as illustrated). In some embodiments, the nose section 164 is tapered and, in some embodiments is conical. In some embodiments, the leading tip 164A of nose section 125 is pointed or sharp to promote penetration into the target T.

The body 166 and the nose 164 may be formed of any suitable material(s). In some embodiments, the body 166 and the nose 164 are formed of different materials from one another. In some embodiments, the body 166 is formed of a first material such as a polymer, and the nose 164 is formed of a heavier material such as metal. In some embodiments, the projectile also includes a heavy ballast 166A (e.g., metal) in the body 166.

In some embodiments, the length L1 (FIG. 9) of the projectile 160 is in the range of from about 10 to 16 inches.

In some embodiments, the maximum outer diameter D1 (FIG. 9) of the projectile body 166 is in the range of from about 3 cm to 12 cm.

In some embodiments, the ratio of the length L1 to the outer diameter D1 is in the range of from about 8 to 15.

In some embodiments, the mass of the projectile 160 is in the range of from about 70 to 350 grams without a payload.

The projectile 160 may further include stationary fins 166B.

The projectile 160 includes retention features in the form of lugs 168 configured secure the projectile 160 to the base module 111 and cooperate with the base module release mechanism 124A to selectively release the projectile 160 from the base module 111. In the illustrated embodiment, the lugs 168 are received and held in slots 122A (FIGS. 3 and 4) in the corresponding seat 122. In order to effect release of the projectile 160, the actuator 124B operates the release mechanism 124A to drive the projectile 160 rearward, enabling the lugs 168 to drop out of the slots 122A.

The projectile 160 includes (each onboard) one or more sensors 170, one or more self-designation features 172, a projectile controller 174, a battery 176, an RF communication system 178, and an onboard steering system 180. The various components may be mounted in and/or on the body 166 and nose 164 so that the projectile 160 maintains an aerodynamic profile.

The sensor or sensors 170 may include a barometer, a magnetometer, an airspeed sensor, a microphone, a camera, a gyro, an accelerometer, or a photocell (e.g., light sensing), for example.

The self-designation feature 172 may be a light emitter, in some embodiments an infrared light emitter and, in some embodiments an infrared LED. In some embodiments, the self-designation feature(s) 172 includes a blue light emitter (400 to 480 nm wavelength light). In some embodiments, the self-designation feature(s) 172 includes a UV light emitter (240 to 400 nm wavelength light). Each self-designation feature 172 may include a suitable driver.

The projectile controller 174 may be any suitable device or processor, such as a microprocessor-based computing device. The functionality of the projectile controller 174 may be distributed across or embodied in one or more controllers forming a part of the projectile 160. The modules 170M, 180M discussed below are computer program code modules that may be embodied in software and/or firmware as discussed below. The modules 170M, 180M may be embodied in the projectile controller 174, for example.

The projectile RF communication system 178 includes an RF communication module 178M and an RF receiver 178B. In some embodiments, the RF communication system 178 also includes an RF emitter or transmitter 178A. In some embodiments, the projectile 160 does not include an RF transmitter. The RF transmitter 178A and the RF receiver 178B may be combined in an RF transceiver.

The onboard steering system 180 includes a steering module 180M, one or more steering mechanisms including one or more movable aerodynamic control surfaces on the outer surface of the projectile body 166, and one or more steering actuators operable by the projectile controller 174 and the steering module 180M to selectively move the aerodynamic control surfaces to steer and stabilize the projectile 160 in flight.

In the illustrated embodiment, the onboard steering system 180 includes a first steering mechanism 182A including fins 183A (FIG. 7), and a second steering mechanism 182B including canards 183B. The onboard steering system 180 includes steering actuators 184A operable to selectively articulate or pivot the fins 183A relative to the body in directions F1, F2. The onboard steering system 180 also includes steering actuators 184B operable to selectively articulate or pivot the canards 183B relative to the body in directions C1, C2. In some embodiments, the steering mechanisms 182A, 182B and steering actuators 184A, 184B are configured and operable to rotate each of the four control surfaces 183A, 183B independently of one another. The steering actuators 184A, 184B may be electric motors. Other types and configurations of steering mechanisms may be used.

The remote control station 30 (FIG. 10) may include a human-machine interface 32 including a display 32A and one or more input devices (e.g., a keypad 32B, touch screen 32C, and/or a joy stick 32D). The remote control station 30 includes an RF transceiver 36 and an RF antenna 36A operative to RF transmit and RF receive. In some embodiments, the remote operator station 30 is a portable device.

The weapon system 10 may be used as follows in accordance with some method embodiments. It will be appreciated that certain of the steps and aspects described below and may be modified or omitted as desired and in accordance with other embodiments.

As illustrated in FIG. 1, the weaponized aerial vehicle 20 is flown to a strike position above and in the vicinity of an intended target or targets T (hereinafter, the target region TR). For the purpose of discussion, the description below will describe an implementation wherein only a single target T is to be attacked.

In the strike position, the base system 110 acquires image data of the target region TR. The image data is RF transmitted (i.e., using RF radio signals) to the remote station 30 and displayed on the remote station 30 to the operator. The operator uses the remote station 30 to select and designate the target T. In some embodiments, the weapon system 10 pre-identifies potential targets from the image data and identifies them on the remote station 30 to the operator as target candidates.

Using the remote station 30, the operator instructs the remote station 30 to initiate the attack on the designated target T. This may be accomplished by the act of selecting/designating the target T, or by a subsequent operator input confirming the designation or launching the attack.

In response to the operator attack initiation instruction, the remote station 30 commands (via RF signal communication) the base system 110 to initiate the attack. In response to this command, the release system 124 releases one of the projectiles 160 (indicated in FIG. 1 and hereinafter referred to by the numeral 160T) from the base module 111. More particularly, the release system 124 operates a release actuator 124B to actuate its associated release mechanism 124A to release the kinetic projectile 160T secured thereby. The projectile 160T will then fall under force of gravity toward the earth G.

As the gravity-driven projectile 160T free falls, the target tracking system 140 tracks the position of the target T. More particularly, the base system 110 acquires image data of the target T and target region TR, and the image data is processed by the target tracking module 140M.

Additionally, as the gravity-driven projectile 160T falls, the projectile tracking system 144 of the projectile guidance system 142 tracks the position of the projectile 160T. More particularly, the base system 110 acquires image data of the inflight projectile 160T, and the image data is processed by the projectile tracking system 144.

The projectile control system 146 uses the target tracking data generated by the target tracking system 140 and the projectile tracking data generated by the projectile tracking system 144 to steer the inflight projectile 160T toward the target T and, in some embodiments, stabilize the projectile 160T. More particularly, the projectile control module 146M determines an intended, projected, or planned path of the projectile 160T to the target T, and sends corresponding steering command signals to the projectile 160T that cause the projectile 160T to steer itself along this planned path. The steering command signals are communicated via RF communication signals from the base RF communications system 136 to the projectile RF communications system 178. The steering module 180M of the onboard steering system 180 processes the steering command signals and correspondingly actuates the steering actuators 184A, 184B to drive the steering mechanisms 182A, 182B to adjust the aerodynamic control surfaces 183A, 183B as needed to redirect the projectile 160.

In some embodiments, the projectile 160T is released from the base module 111 at an altitude in the range of from about 500 ft to 10,000 ft.

In some embodiments, the projectile 160T has a terminal velocity in the range of from about 45 m/s to 300 m/s.

In some embodiments, the target tracking system 140 tracks the position of the target T before the base module 111 drops the projectile 160T. In some embodiments, the target tracking system 140 tracks the position of the target T continuously or periodically while the projectile 160T is inflight (i.e., between the time the base module 111 drops the projectile 160T and the projectile 160T strikes the target T, or lands on the ground G or elsewhere). In some embodiments, the target tracking system 140 tracks the position of the target T both before the projectile 160T is released and throughout the substantial entirety of the flight of the projectile 160T.

In some embodiments, the projectile guidance system 142 tracks and commands the steering of the projectile 160T continuously or periodically while the projectile 160T is inflight. In some embodiments, the projectile guidance system 142 tracks and commands the steering of the projectile 160T throughout the substantial entirety of the flight of the projectile 160T.

Accordingly, the projectile 160T operates as a kinetic, hit-to-kill projectile that is external command-guided by the base module 111. The base system 110 executes automatic and programmatic tracking of the target T, and automatic and programmatic tracking of the projectile 160T. The base system 110 automatically and programmatically determines the proper projectile trajectory or path to cause collision between the projectile 160T and the target T, and updates this determination while the projectile 160T is inflight. The base system 110 automatically and programmatically determines the appropriate projectile steering adjustments or responses to cause the projectile 160T to follow this path to the target T, and updates the steering adjustments response to course corrections determined by the base system 110. The base system 110 automatically and programmatically commands the projectile 160T to make the determined appropriate projectile steering adjustments.

In some embodiments, the projectile delivery system 100 automatically and programmatically executes each of the steps and functions described above after the operator has initiated the attack (i.e., instructed the base system 110 to proceed with the attack via the remote station). It will be appreciated that this protocol retains the operator in the command loop up until the attack is initiated, but does not require operator intervention thereafter to complete the attack.

In some embodiments, the weaponized aerial vehicle 101 is configured such that the aerial vehicle 20 is automatically placed in a tracking/guidance mode when the kinetic projectile 160T is released and in flight. In the tracking/guidance mode, flight of the aerial vehicle 20 is controlled to optimize guidance of the kinetic projectile 160T.

In some embodiments, the camera 130 or 132 of the projectile tracking system 140 that is used to track the inflight projectile 160T is secured to the aerial vehicle 20 without a gimbal.

In some embodiments, the target tracking system 140 uses data acquired from one or more of the cameras 130, 132 capturing radiation (e.g., light) from the target T to track the target T. In some embodiments, camera(s) sense radiation (e.g., visible light, IR, or UV) from the target T. In some embodiments, the target tracking system 140 tracks the target T using computer vision based on the image data from the camera(s) 130, 132.

In some embodiments, the weapon system 10 also uses a designation laser 42 (FIG. 1) from a laser source 40 that is not located on the base module 111 or on the projectile 160T. In some embodiments, the laser source 40 is not located on the aerial vehicle 20. The laser source 40 is instead located completely remote from the launch platform. The laser 42 is used to provide target designation by illumination of the target T or a corresponding spot. The target tracking system 140 functions in substantially the same manner as discussed above, with the laser illumination being detected by the base module camera systems. In some embodiments, the illumination image would override other target criteria, with the computer vision system tracking the laser illumination and command-guiding the projectile 160T to the laser illumination.

In some embodiments, the projectile tracking system 144 uses data acquired from one or more of the cameras 130, 132 capturing radiation (e.g., light) from the projectile 160T to track the projectile 160T. In some embodiments, camera(s) sense radiation (e.g., visible light, IR, or UV) from the projectile 160T. In some embodiments, the projectile tracking system 144 tracks the projectile 160T using computer vision based on the image data from the camera(s).

In some embodiments, the projectile tracking system 144 uses the self-designation feature 172 onboard the projectile 160T. The projectile tracking system 144 functions in substantially the same manner as discussed above, with the self-designation feature 172 being detected by the base module camera systems. In some embodiments, the self-designation feature 172 illumination image would override other projectile tracking criteria, with the computer vision system tracking the self-designation feature 172.

In some embodiments, the projectile guidance system 142 controls the flight of the released projectile 160T using only one-way RF signal communication between the base system 110 and the projectile 160T. As discussed above, the base system 110 sends steering commands to the kinetic projectile 160T. However, the kinetic projectile 160T does not send signals to the base system 110.

In some embodiments, the projectile guidance system 142 controls the flight of the released projectile 160T using two-way RF signal communication between the base system 110 and the projectile 160T. As discussed above, the base system 110 sends steering commands to the kinetic projectile 160T. The kinetic projectile 160T sends projectile status data to the base system 110 via RF transmission to incorporate into the projectile tracking and guidance processing by the base system 110. In some embodiments, the projectile status data includes at least one of: a magnetometer-based heading reading; an airspeed of the projectile 160T; an altitude of the projectile 160T; an attitude of the kinetic projectile 160T; an orientation of the kinetic projectile 160T; and a rate of rotation of the kinetic projectile 160T about each of a roll axis, a pitch axis, and a yaw axis. The kinetic projectile 160T may include an onboard projectile state sensor that acquires the projectile status data instantaneously (e.g., one or more of the sensors 170).

The projectile control system 146 can control the onboard steering system 180 both to change or follow a flight path and to stabilize the projectile 160T inflight. According to some embodiments, the steering mechanisms 182A, 182B is configured such that the fins 183A can be rotated in opposing directions to cause the projectile 160T to roll in either direction (i.e., leftward or rightward rotation about the axis L-L), and the canards 183B can be rotated in the same direction to adjust the pitch of the projectile 160T.

In some embodiments, the projectile delivery system 100 is operated to release and drop multiple projectiles 160 (i.e., a salvo of the projectiles 160) from the base module 111. The released projectiles 160 can be tracked, guided and controlled by the base system 110 in the same manner as described above for the projectile 160T. The projectiles 160 of the salvo can all be guided to the same target T or to different targets.

The remote station 30 can enable or support operator interaction with the base system 110. In some embodiments, the remote station 30 communicates with the base system 110 via two-way RF signal communication. The remote station 30 may be located apart from the weaponized aerial vehicle 101. For example, the remote station 30 may be a ground-based device. In other embodiments, the remote station 30 may be on or integrated into the aerial vehicle 20.

Figure 10:
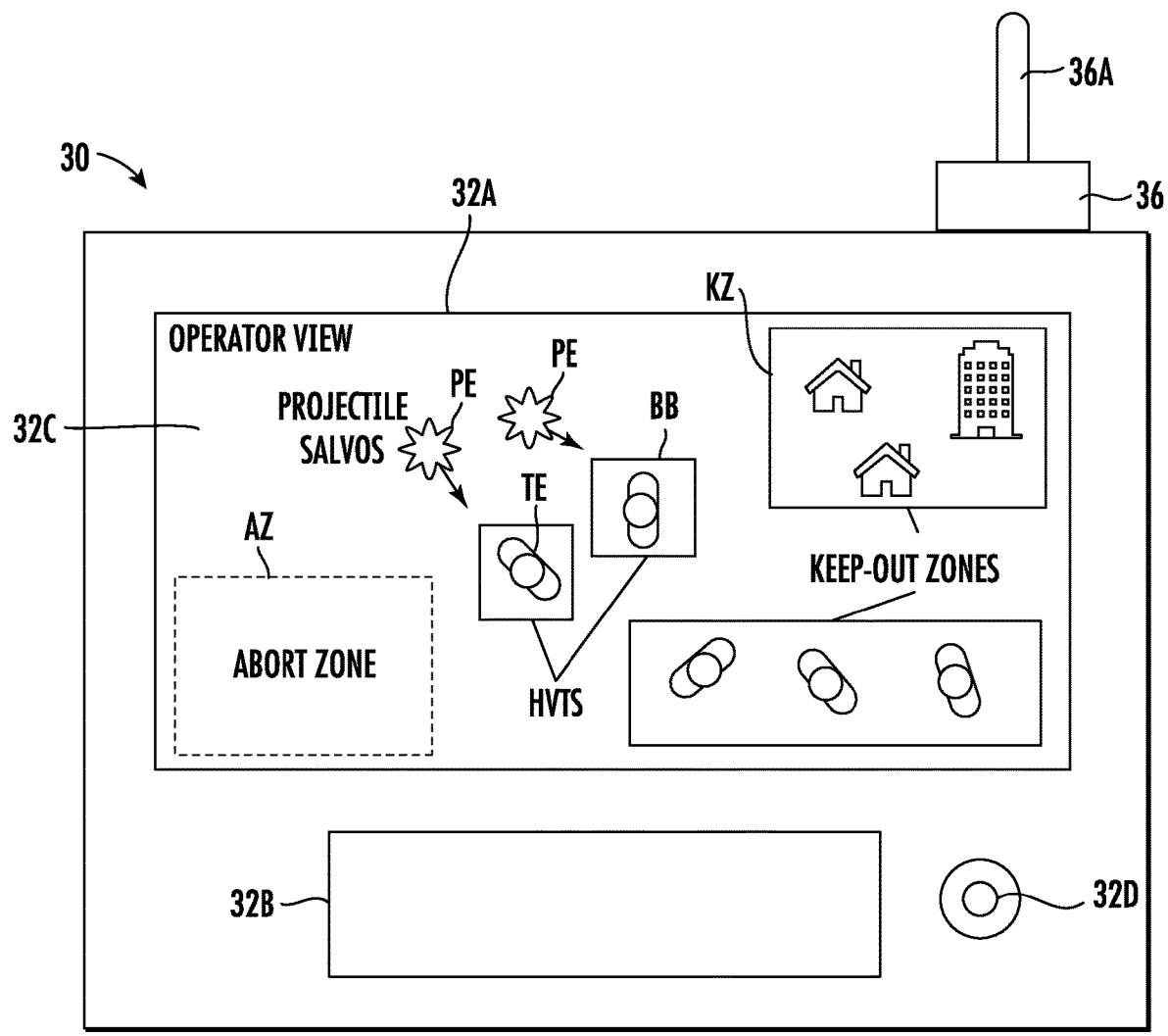
FIG. 10 is a plan view of a remote control station forming a part of the weapon system of FIG. 1.

FIG. 10 shows an example operator view on the remote station display 32A. In the example interface, the operator view may include certain helpful visual elements (e.g., as discussed below) to assist the operator in assessing the target region, entering instructions and monitoring the progress of the attack.

In some embodiments, the operator uses the remote station 30 to designate the target T. The remote station 30 may list or display target candidates from which the operator selects.

As discussed herein, in some embodiments, after the target is selected and the operator enters the command to attack, all target tracking, projectile tracking, and projectile steering is automatically and programmatically controlled by the base system 110 without operator input.

The remote station 30 may be configured to enable the operator to abort the attack. Responsive to an operator abort command, the base system 110 will automatically and programmatically steer the inflight projectile 160T away from the target T. In some embodiments, the remote station 30 is configured to enable the operator to designate an abort zone (indicated by abort zone graphical element AZ) to which the base system 110 will automatically and programmatically steer the inflight projectile 160T responsive to an abort command, if any.

The remote station 30 may be configured to enable the operator to designate one or more keep out zones (indicated by keep out zone graphical element KZ). The base system 110 will automatically and programmatically steer the inflight projectile 160T away from each keep out zone if the projected terminal vector of the projectile 160T is in the keep out zone.

The remote station 30 may be configured to enable the operator to designate the number of projectiles 160 to drop onto the target T.

The remote station 30 may be configured to display a virtual tracking of the target T and the projectile 160T. For example, in FIG. 10 the display 32A shows a projectile (or projectile salvo) graphical element PE representing the inflight projectile 160T, a target graphical element TE representing the target T, and a bounding box graphical element BB. In some embodiments, the remote station 30 updates the display substantially in real time.

The remote station 30 may also be configured to display a live or intermittent image feed from one or more of the base system cameras 130, 132. In some embodiments, the camera feed shows the target T. In some embodiments, the camera feed shows the inflight projectile 160T.

In accordance with further embodiments, the projectile delivery system 100 is used to deliver a projectile 160T to sense an environmental condition. In this case, the weaponized aerial vehicle 101 and the projectile delivery system 100 are used to release and steer a projectile 160T to a target location. The target location may be designated by an operator using the remote station 30 as described above for the target T.

Once the projectile 160T has landed at or proximate the target location, the sensor 170 is operated to detect the environmental condition. The environmental condition may include, for example, sound (e.g., eavesdropping), vibration, temperature, soil composition, air composition, radio-frequency signals. The projectile 160T can deposit in the target location quietly and undetected, and can remain in the target location for persistent data gathering.

In some embodiments, the projectile 160T transmits (via RF signal communication) the environmental condition data acquired by the sensor 170 to the remote station 30 or to the base station 110, which may relay the environmental condition data to the remote station 30 or elsewhere. In some embodiments, the projectile 160T records the environmental condition data acquired by the sensor 170.

In some embodiments, each projectile 160 does not include or carry explosive material or incendiary material.

In some embodiments, the projectiles 160, when released, are driven downward only by gravity.

In some embodiments, each projectile 160 does not include or carry an onboard propulsion mechanism.

In some embodiments, each projectile 160 does not include or carry an onboard target tracking system.

In some embodiments, each projectile 160 does not include or carry an onboard projectile guidance system.

In some embodiments, each projectile 160 does not include or carry a GPS signal receiver.

The projectile delivery system 100 requires no targeting sensor on the kinetic projectile 160. The projectile delivery system 100 does not require illumination (e.g., a designation laser beam) or other signal generation from the weaponized aerial vehicle 101 or the kinetic projectile 160. Instead, the projectile delivery system 100 may leverage computer vision systems that sense radiation (visible light, IR, UV, etc.) for targeting and projectile guidance. Elimination of signal sources allows for a simpler, lighter, cheaper system.

In some embodiments, the projectile delivery system 100 is a command-guided type system wherein target sensing and projectile guidance is done exclusively by the launch platform. Launch platform cameras, or camera, are used to image both targets and projectiles inflight. Cameras may have sensitivity to visible light, infrared, or other light frequencies. In some embodiments, computer vision algorithms are used to continuously analyze the camera images to identify and track targets. Light sources maybe used on the projectile to enhance tracking. These light sources would typically be outside the visible range, and system operation depends only on detection by the base module 111 (the launch platform).

Projectile delivery systems according to embodiments of the invention can be platform agnostic. Lethality is provided by the potential energy of gravity. The projectile is guided by the base system, so that the projectile delivery system does not require or use GPS guidance. Guidance algorithms and calculations are done on the base system. Moving this work to the base system means cheaper, simpler, lighter projectiles. This allows a given projectile delivery module 102 to include more projectiles.

In some embodiments, the kinetic projectiles are hit-to-kill projectiles, without incendiary or explosive material, which greatly reduces the potential for collateral damage. The projectiles can present a small acoustic signature.

Omission of light sources, guidance processing, and the like from the projectiles can provide several advantages. The projectiles 160 can be less costly and less complex. The projectiles 160 can be lighter and smaller. These reductions can reduce the acoustic signatures of the projectiles. These reductions can also reduce the power requirement to carry the projectile delivery module 102, thereby enhancing the operational endurance of the weaponized aerial vehicle 101.

In some embodiments, the base module 111 is reusable. For example, the base module 111 can be reloaded with projectiles 160 and/or can be remounted on a second aerial vehicle.

Figure 11:
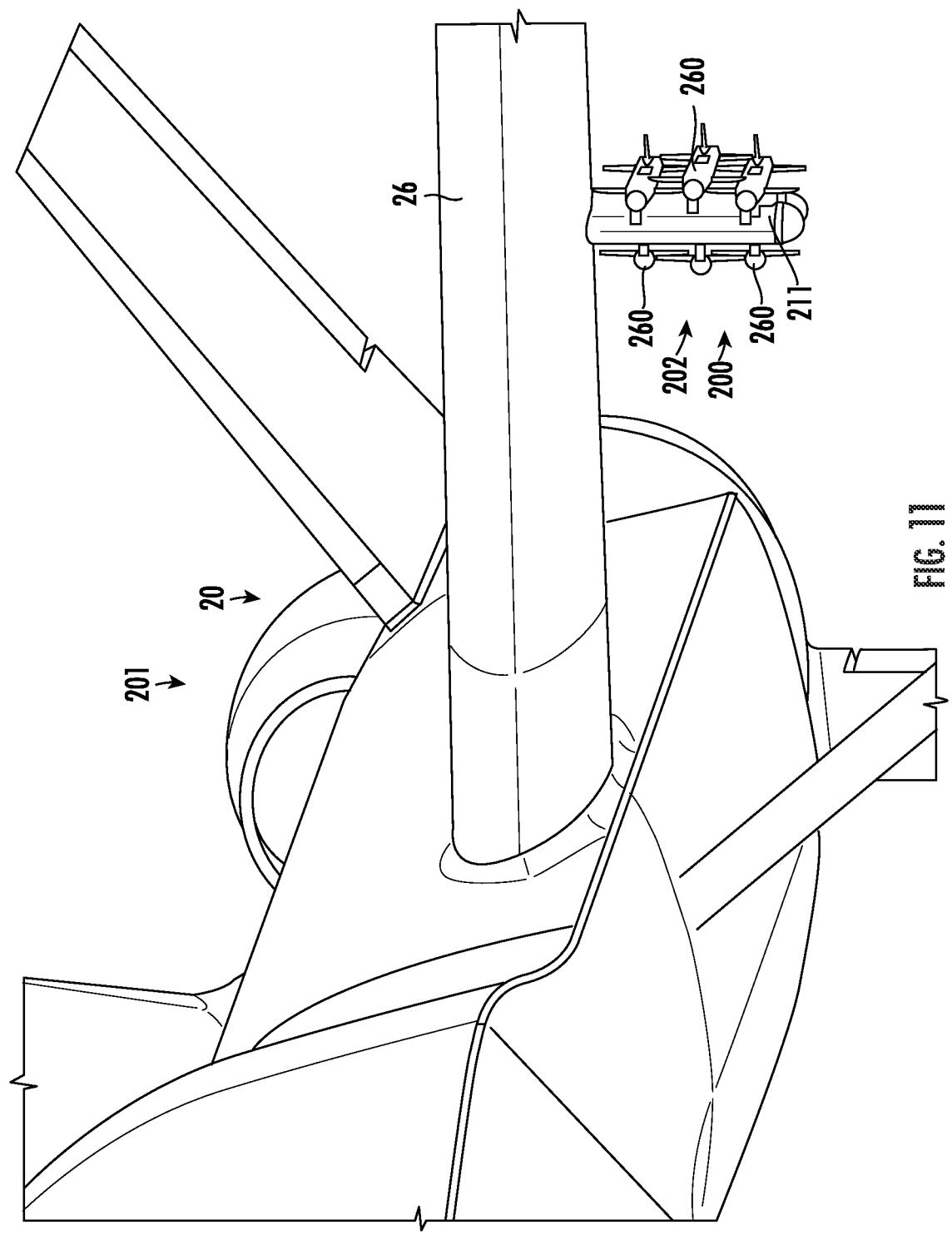
FIG. 11 is an enlarged, fragmentary, bottom perspective view of a weaponized aerial vehicle according to further embodiments.
Figure 12:
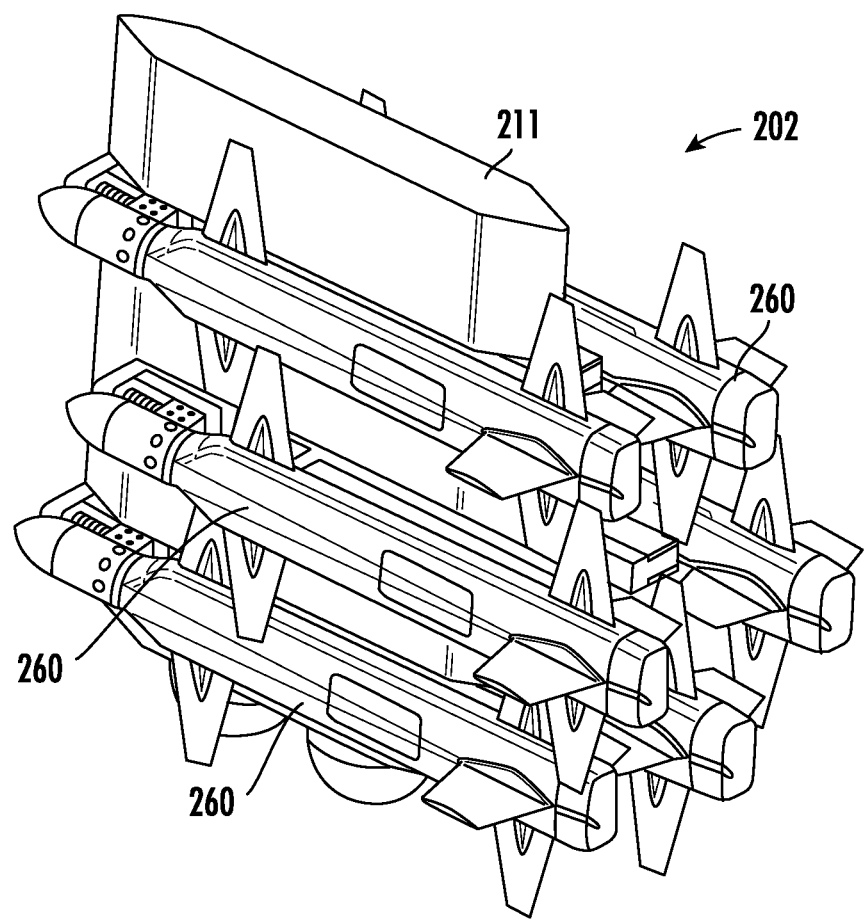
FIG. 12 is top, rear perspective view of a projectile delivery module forming a part of the weaponized aerial vehicle of FIG. 11.
Figure 13:
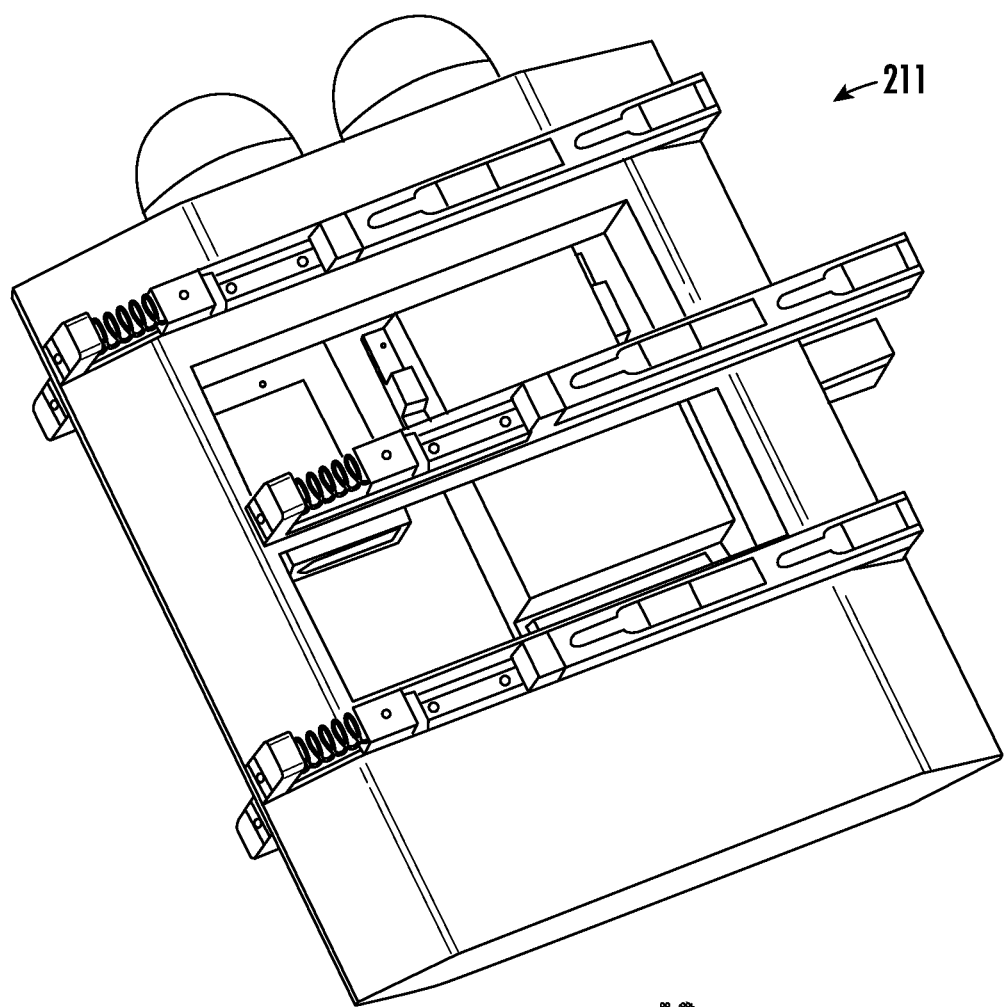
FIG. 13 is bottom, front perspective view of the projectile delivery module of FIG. 12.

With reference to FIGS. 11-13, a projectile delivery system 200 and a weaponized aerial vehicle 201 according to further embodiments are shown therein. The projectile delivery system 200. The projectile delivery system 200 includes a projectile delivery module 202 including a base module 211 and projectiles 260 corresponding to the projectile delivery module 102, the base module 111, and the projectiles 160, respectively, of the projectile delivery system 100. The projectile delivery system 200 and a weaponized aerial vehicle 201 may be used in the same manner as the projectile delivery system 100 and the weaponized aerial vehicle 101. The projectile delivery system 200 differs from the projectile delivery system 100 in that the projectile delivery module 202 is configured to be mounted on a wing 26 or pylon of the aerial vehicle 20.

Figure 14:
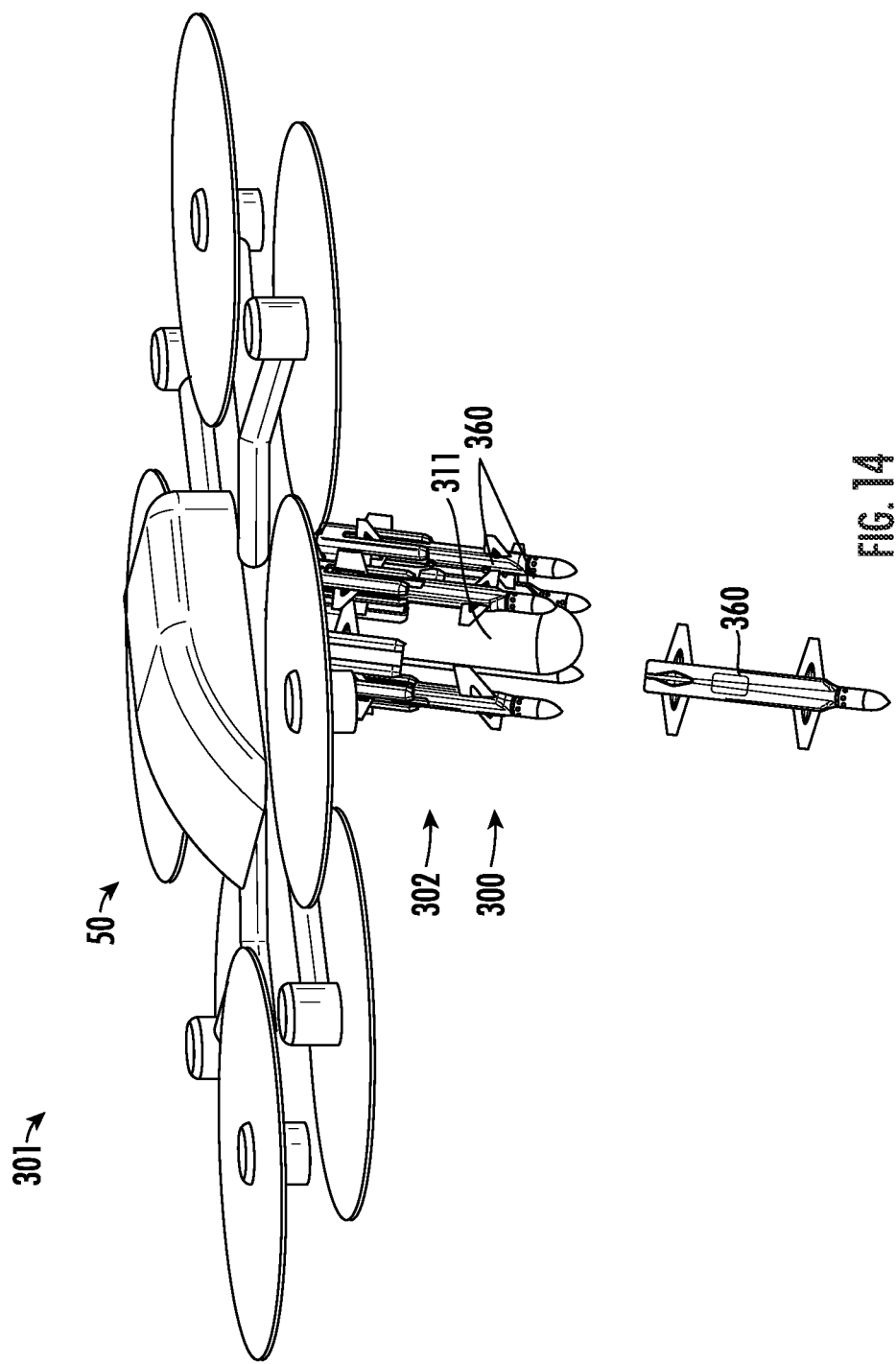
FIG. 14 is a perspective view of a weaponized aerial vehicle according to further embodiments.
Figure 15:
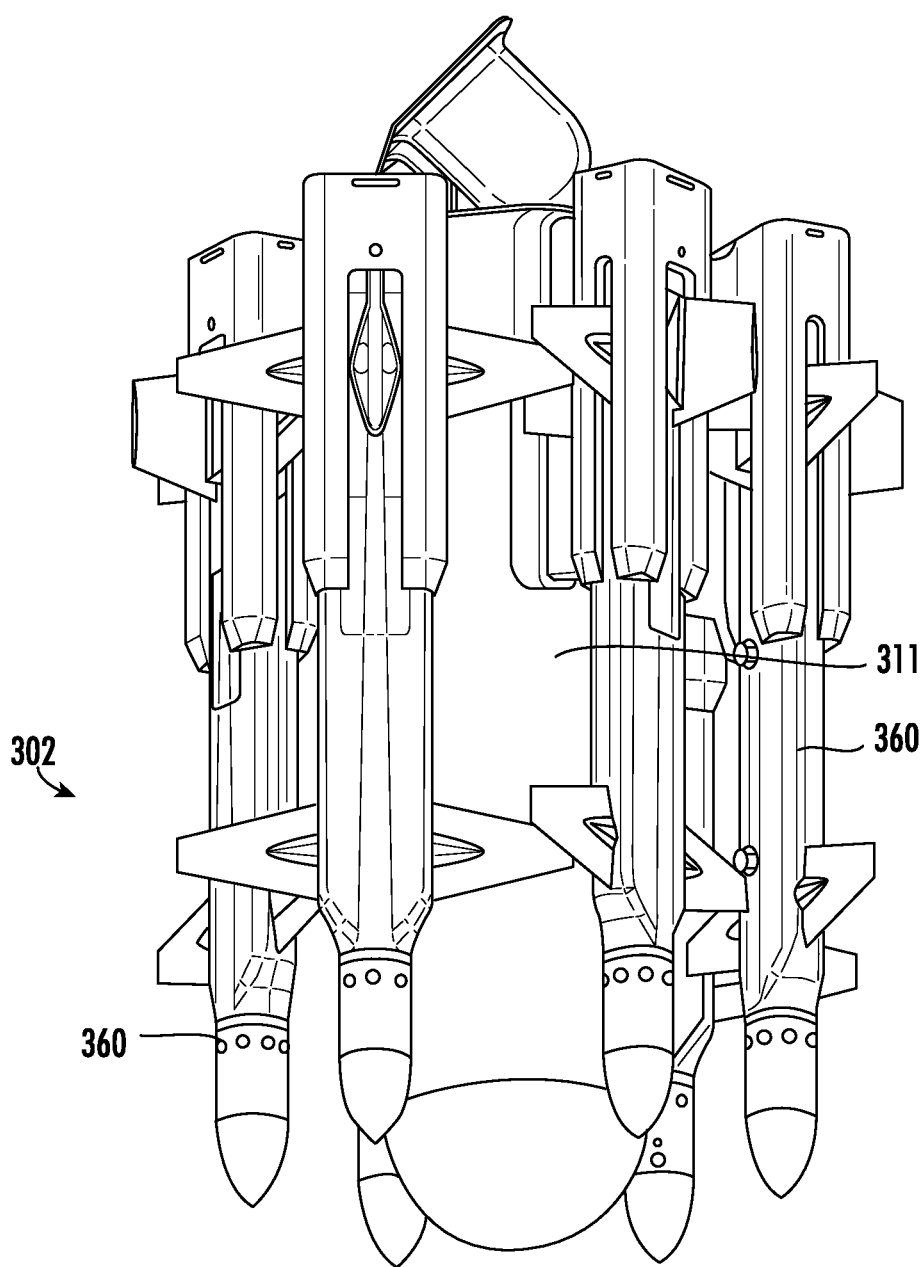
FIG. 15 is a perspective view of a projectile delivery module forming a part of the weaponized aerial vehicle of FIG. 14.
Figure 16:
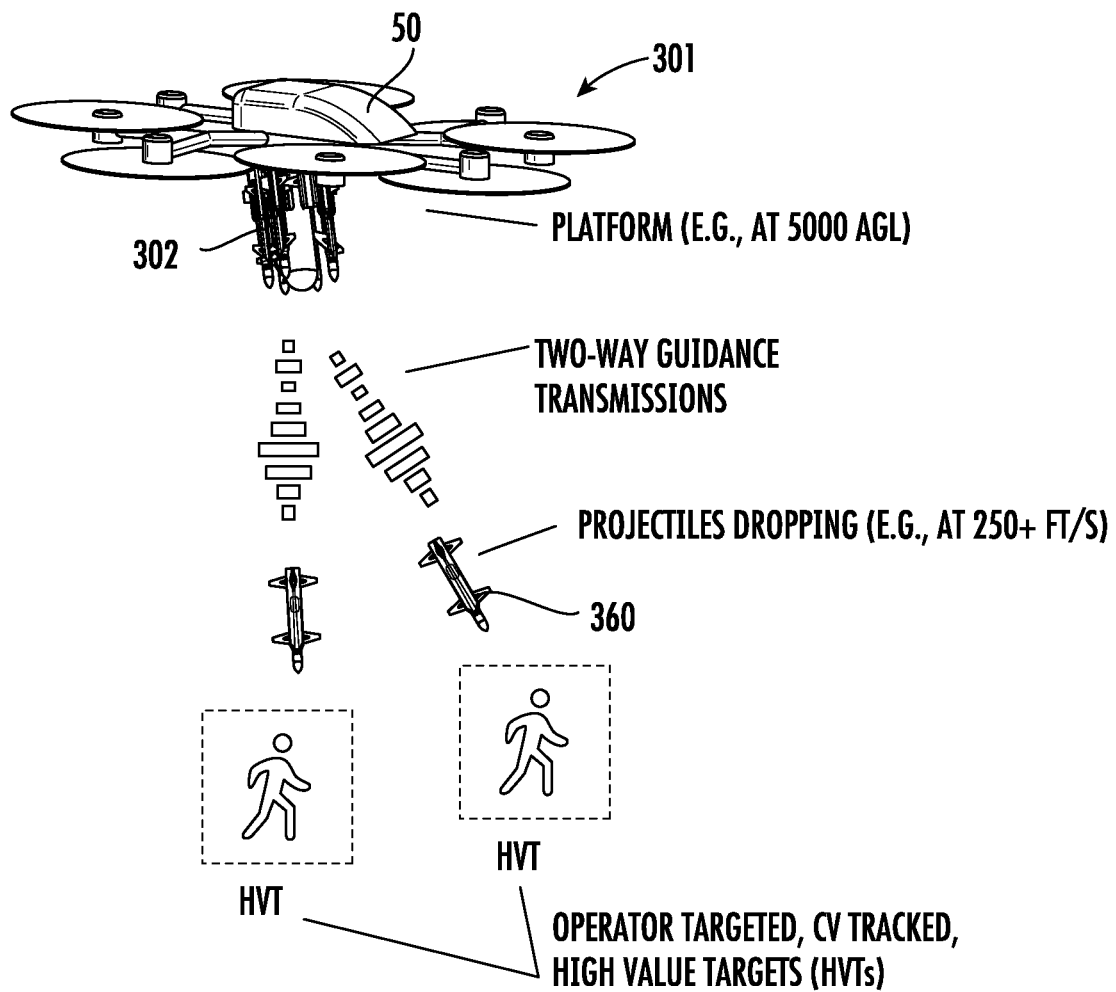
FIG. 16 is a schematic view illustrating use of the weaponized aerial vehicle of FIG. 14.

With reference to FIGS. 14-16, a projectile delivery system 300 and a weaponized aerial vehicle 301 according to further embodiments are shown therein. The projectile delivery system 300. The projectile delivery system 300 includes a projectile delivery module 302 including a base module 311 and projectiles 360 corresponding to the projectile delivery module 102, the base module 111, and the projectiles 160, respectively, of the projectile delivery system 100. The projectile delivery system 300 and a weaponized aerial vehicle 301 may be used in the same manner as the projectile delivery system 100 and the weaponized aerial vehicle 101. The projectile delivery system 200 differs from the projectile delivery system 100 in that the projectile delivery module 302 has a turret configuration that is well-suited for mounting on the underside of an aerial vehicle 50 such as a UAV quadcopter.

In some embodiments, one or more of the kinetic projectiles mounted on and launchable from the projectile delivery system includes an energetic payload. In some embodiments, the kinetic projectile is a proximity locating projectile including an energetic payload, and is intended to exercise (e.g., detonate) its energetic payload to multiple targets in an open environment, or through lightly armored commercial vehicles, or by deforming a metal liner in a controlled manner as to deliver damage effects onto a target. In some embodiments, the kinetic projectile is a penetrating projectile including an energetic payload, and intended to perforate thin metal or multiple layers of thin metal sheeting of a target, survive the penetrating impact event, and exercise its energetic payload onto the intended targets of interest following the penetrating impact event.

An energetic payload as discussed above may be of any suitable type and may be integrated into the kinetic projectile in any suitable manner. In some embodiments, the energetic payload forms a part of a warhead integrated within the kinetic projectile.

In some embodiments, the kinetic projectile includes a fragment projection warhead including fragments and/or a casing and containing high explosive energetics (e.g., plastic bonded explosives such as PBXN-9). When detonated, the high explosive drives the fragments, or fragments formed from the casing, outward into the target(s). The warhead thus operates as a grenade-like device. The warhead may include pre-formed fragments and/or explosively formed fragments from a pre-scored casing.

In some embodiments, the kinetic projectile includes a "flash-bang" device that is intended to temporarily stun or incapacitate personnel. In this case, the energetic payload is a combustible material that is detonated or ignited to generate the flash-bang effect.

In some embodiments, the kinetic projectile includes a shaped charge (or charges) configured to sever or breach structures or pierce armor when actuated by detonation of the energetic payload. The shaped charge includes a high explosive (the energetic payload) and a metal liner that is compressed by the high explosive detonation and projected against structures.

In some embodiments, the fragment projection warhead includes explosively formed projectiles configured to pierce armor.

In some embodiments, the kinetic projectile includes an incendiary device including an incendiary material (the energetic payload). In some embodiments, the incendiary material generates pyrophoric reactions when actuated. In some embodiments, the incendiary device is actuated to a start fire at a target or a target location proximate the kinetic projectile.

In some embodiments, the kinetic projectile further includes an integral, onboard fuze system to actuate (e.g., detonate or ignite) the energetic payload. In some embodiments, the fuze system includes a safe-arm-fire (SAF) device and one or more sensors that provide signals to initiate the energetic payload. The SAF device may be either electronic or mechanical in nature. The SAF device may rely on a range of sensors. In some embodiments, the sensor(s) include a sensor specifically for a "height-of-burst" (HOB) type operation, where the sensor senses proximity, to the ground or targeting surfaces, and sends a trigger to the SAF device when some predetermined criteria is met. HOB sensors typically utilize radar, laser distance measuring, or optical means such as stereo vision. In some embodiments, the sensor(s) include one or more of an accelerometer, a gyro, a pressure sensor, a mechanical closure or opening of an electronic circuit, a timer, each of which may be integral to the SAF device. The SAF device can ensure some minimum safe separation of the kinetic projectile from the point of launch by processing sensor signals and applying conditional logic to arm the subsystem for fire accordingly. Once armed, the SAF device's sensor inputs are processed to determine the timing or position of the kinetic projectile for when/where the SAF device initiates the energetic (e.g., explosive) payload.

The energetic payload may be disposed at any suitable location within the kinetic projectile. In some embodiments, the energetic payload and the fuze system are located within the volume of an integral warhead forming a part of the kinetic projectile. In some embodiments, the energetic payload and the fuze system are located in a forward section of the kinetic projectile body and the forward end of energetic payload housing may form the nose of the kinetic projectile.

The nose of the kinetic projectile may have a shape and be composed of a material that enhances the penetration capability of the kinetic projectile warhead into a target. Suitable nose shapes may include ogive, conical, or blunt.

In some embodiments, the kinetic projectile is configured (e.g., the fuze system is configured) such the energetic payload is fired after target perforation. In some embodiments, the kinetic projectile is configured to accomplish this by firing the energetic payload at a known or prescribed distance or time from first impact of the kinetic projectile with a target surface.

Figure 17:
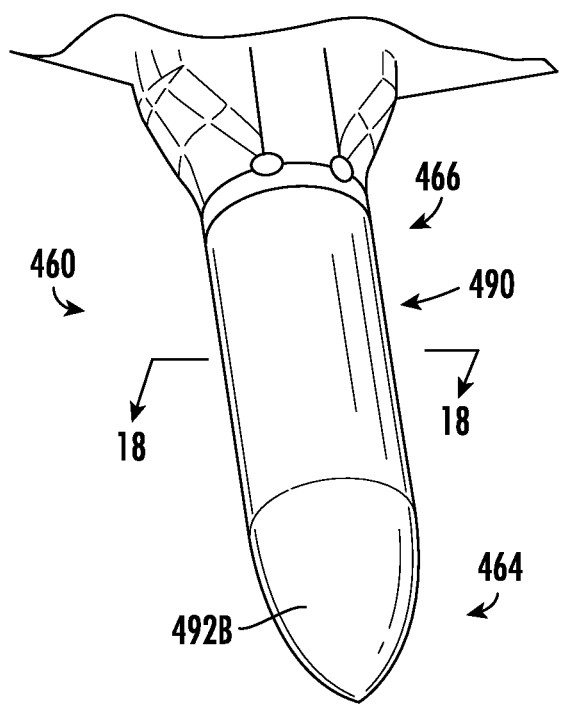
FIG. 17 is a fragmentary, top perspective view of a kinetic projectile according to further embodiments.
Figure 18:
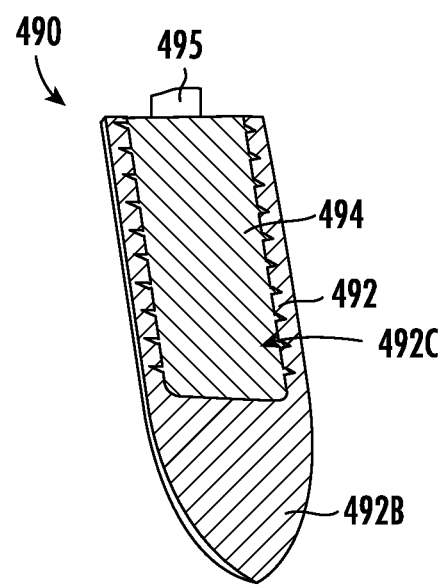
FIG. 18 is a fragmentary, cross-sectional view of a warhead forming a part of the kinetic projectile of FIG. 17 taken along the line 18-18 of FIG. 17.
Figure 19:
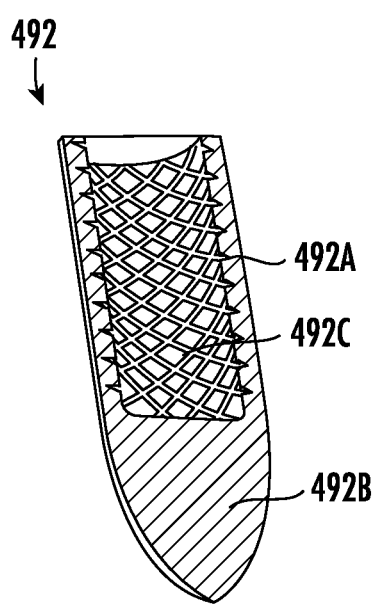
FIG. 19 is a fragmentary, cross-sectional view of a warhead housing forming a part of the warhead of FIG. 18 taken along the line 18-18 of FIG. 17.

With reference to FIGS. 17-19, an example kinetic projectile 460 according to further embodiments and including an energetic payload is shown therein. The kinetic projectile 460 corresponds to the projectile 160 and may be used in the same manner as the projectile 160 in the projectile delivery system 100, 200, or 300, except as follows.

The kinetic projectile 460 includes a warhead 490. The warhead 490 forms the front section of the projectile body 466 and the projectile nose 464. The warhead 490 includes a warhead housing 492. As shown in FIG. 19, the warhead housing 492 includes a pre-scored fragmenting case 492A and an integrated nose 492B defining a cavity 492C. The nose 492B is configured to perforate a target. As shown in FIG. 18, the cavity 492C is filled with an energetic material 494 as described above. In some embodiments, the energetic material 494 is a high explosive material as discussed above. The kinetic projectile 460 further includes a fuze system 495 as discussed above. The fuse system 495 may be integrated into the warhead 490.

In use, the kinetic projectile 460 is launched from a projectile delivery system of a weaponized aerial vehicle (e.g., the projectile delivery system 100 and the weaponized aerial vehicle 101) and guided to a target as disclosed herein. At a desired location relative to the target, the fuze system 495 detonates the energetic material 494, which fragments the fragmenting case 492A and projects the fragments formed thereby at high velocity into the target. In some embodiments, the fuze system 495 postpones or delays its detonation of the energetic material 494 until the kinetic projectile 460 has penetrated the target.

Figure 20:
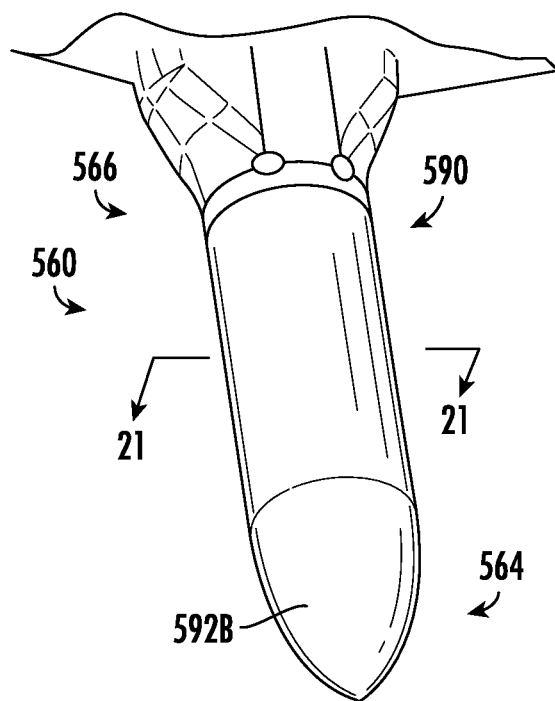
FIG. 20 is a fragmentary, top perspective view of a kinetic projectile according to further embodiments.
Figure 21:
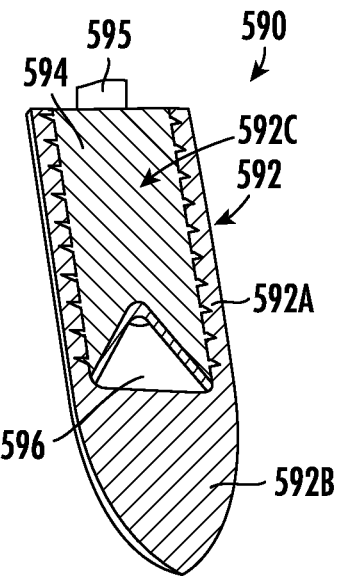
FIG. 21 is a fragmentary, cross-sectional view of a warhead forming a part of the kinetic projectile of FIG. 20 taken along the line 21-21 of FIG. 20.

With reference to FIGS. 20-21, an example kinetic projectile 560 according to further embodiments and including an energetic payload is shown therein. The kinetic projectile 560 may be constructed and used in the same manner as the projectile 460, except as follows.

The kinetic projectile 560 includes a warhead 590. The warhead 590 forms the front section of the projectile body 566 and the projectile nose 564. The warhead 590 includes a warhead housing 592. The warhead housing 592 includes a pre-scored fragmenting case 592A (which may be constructed as shown for the case 492A in FIG. 19) and an attached, frangible nose 592B defining a cavity 592C. The nose 592B is configured to perforate a target.

The cavity 592C is partly filled with an energetic material 594 as described above. In some embodiments, the energetic material 594 is a high explosive material as discussed above. The cavity 592C also contains, at its front end, a metal explosively driven liner, explosively formed penetrator (EFP), or shaped charge jet (SCJ) 596.

The kinetic projectile 560 further includes a fuze system 595 as discussed above. The fuse system 595 may be integrated into the warhead 590.

The kinetic projectile 560 will operate in the same manner as the projectile 460 when detonated by the fuse system 595, except that, in addition to the fragmenting and projection of the case 592A, the metal liner 596 will be compressed by the high explosive detonation and projected against the target.

In the above description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as MATLAB. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A projectile delivery module for use with an aerial vehicle, the projectile delivery module comprising:
    a projectile delivery system including:
        a kinetic projectile including:
            a projectile body;
            an onboard steering system including:
                a steering mechanism operable to change an attitude, orientation, and/or direction of flight of the kinetic projectile; and
                a steering actuator operable to control the steering mechanism; and
            a radio-frequency (RF) receiver; and
        a base system including:
            an RF transmitter to communicate with the RF receiver of the kinetic projectile;
            a projectile holder configured to secure the kinetic projectile to the aerial vehicle and configured to selectively release the kinetic projectile;
            a target tracking system; and
            a projectile guidance system including a projectile tracking system and a projectile control system;
    wherein the projectile delivery module is configured to be mounted on the aerial vehicle for flight therewith; and
    wherein the base system is configured to:
        release the kinetic projectile from the projectile holder such that the kinetic projectile is driven toward a target by gravity;
        track the target using the target tracking system;
        track the released kinetic projectile using the projectile tracking system; and
        automatically control the onboard steering system of the kinetic projectile using the projectile control system to adjust a trajectory of the falling kinetic projectile to steer the kinetic projectile to the target.

2. The projectile delivery module of claim 1 wherein the kinetic projectile does not include or carry explosive material or incendiary material.

3. The projectile delivery module of claim 1 wherein the released kinetic projectile is driven downward only by gravity.

4. The projectile delivery module of claim 1 wherein the kinetic projectile does not include or carry an onboard propulsion mechanism.

5. The projectile delivery module of claim 1 wherein the kinetic projectile does not include or carry an onboard target tracking system.

6. The projectile delivery module of claim 1 wherein the kinetic projectile does not include or carry an onboard projectile guidance system.

7. The projectile delivery module of claim 1 wherein the kinetic projectile does not include or carry a GPS signal receiver.

8. The projectile delivery module of claim 1 wherein the kinetic projectile delivery system includes a plurality of the kinetic projectiles.

9. The projectile delivery module of claim 8 wherein the base system is operable to release a plurality of the kinetic projectiles in a salvo directed at the target.

10. The projectile delivery module of claim 1 wherein the projectile body is elongate.

11. The projectile delivery module of claim 10 wherein the projectile body has a length:width ratio in the range of from about 8 to 15.

12. The projectile delivery module of claim 10 wherein the projectile body has a length in the range of from about 10 to 16 inches long, and a mass in the range of from about 70 to 350 grams without a payload.

13. The projectile delivery module of claim 10 wherein the projectile body has a leading end that is tapered to pierce the target.

14. The projectile delivery module of claim 1 the projectile body includes a polymeric component and a metal nose.

15. The projectile delivery module of claim 1 wherein the projectile steering mechanism includes an adjustable aerodynamic control surface.

16. The projectile delivery module of claim 15 wherein the adjustable aerodynamic control surface is a movable fin or canard.

17. The projectile delivery module of claim 15 wherein the projectile steering actuator includes a motor operable to move the aerodynamic control surface.

18. The projectile delivery module of claim 1 wherein:
the kinetic projectile includes a self-designation feature; and
the projectile tracking system uses the self-designation feature to track the released projectile in flight.

19. The projectile delivery module of claim 18 wherein the self-designation feature is an infrared light emitter, a blue light (400 to 480 nm) emitter, or a UV (240 to 400 nm) emitter.

20. The projectile delivery module of claim 1 wherein the projectile delivery system controls the flight of the released projectile using one-way communication between the base system and the kinetic projectile, wherein:
the base system sends steering commands to the kinetic projectile; and
the kinetic projectile does not send signals to the base system.

21. The projectile delivery module of claim 1 wherein the projectile delivery system controls the flight of the released projectile using two-way communication between the base system and the kinetic projectile, wherein:
the base system sends steering commands to the kinetic projectile; and
the kinetic projectile sends projectile status data to the base system to incorporate into projectile tracking and guidance processing by the base system.

22. The projectile delivery module of claim 21 wherein the projectile status data includes at least one of: a magnetometer-based heading reading; an airspeed of the projectile; an altitude of the projectile; an attitude of the kinetic projectile; an orientation of the kinetic projectile; and a rate of rotation of the kinetic projectile about each of a roll axis, a pitch axis, and a yaw axis.

23. The projectile delivery module of claim 21 wherein the kinetic projectile includes an onboard projectile state sensor that acquires the projectile status data instantaneously.

24. The projectile delivery module of claim 1 configured such that:
the aerial vehicle is automatically placed in a tracking/guidance mode when the kinetic projectile is released and in flight; and
in the tracking/guidance mode, flight of the aerial vehicle is controlled to optimize guidance of the kinetic projectile.

25. The projectile delivery module of claim 24 wherein:
the projectile tracking system includes a camera to track the inflight projectile; and
the camera is secured to the aerial vehicle without a gimbal when the projectile delivery module is mounted on the aerial vehicle.

26. The projectile delivery module of claim 1 wherein the kinetic projectile includes an environmental sensor on the projectile body.

27. The projectile delivery module of claim 26 wherein the environmental sensor includes at least one of a microphone and a camera.

28. The projectile delivery module of claim 1 wherein the projectile delivery system is configured to:
receive a target designation from an operator; and thereafter
automatically execute the tracking of the target and the tracking and guidance of the kinetic projectile using the base system onboard the aerial vehicle.

29. The projectile delivery module of claim 1 wherein the projectile delivery system is configured to:
receive a target designation from an operator;
receive a designation of an abort zone from the operator; and
guide the released kinetic projectile to the abort zone in response to a command to abort the attack.

30. The projectile delivery module of claim 1 wherein the projectile delivery system is configured to:
receive a target designation from an operator;
receive a designation of a keep out zone from the operator; and
prevent the kinetic projectile from landing in the keep out zone.

31. The projectile delivery module of claim 1 wherein:
the base system includes a camera to be mounted on the aerial vehicle; and
the target tracking system is configured to:
acquire image data from the camera; and
track the target using computer vision.

32. The projectile delivery module of claim 31 wherein the projectile guidance system is configured to:

receive a bounding box designation from an operator; and
control the onboard steering system of the kinetic projectile to adjust a trajectory of the falling projectile to steer the kinetic projectile into a space designated by the bounding box.

33. The projectile delivery module of claim 1 wherein the base system is configured to communicate with a remote operator terminal to report projectile tracking data relative to a location of the target and/or a designated zone.

34. The projectile delivery module of claim 33 wherein the base system is configured to communicate with a remote operator terminal to report projectile tracking data relative to a location of the target and relative to at least one of a designated abort zone and a designated keep out zone.

35. The projectile delivery module of claim 1 wherein the kinetic projectile includes an energetic payload.

36. A weaponized aerial vehicle comprising:
an aerial vehicle; and
a projectile delivery system mounted on the aerial vehicle for flight therewith, the projectile delivery system including:
  a kinetic projectile including:
    a projectile body; and
    an onboard steering system including:
      a steering mechanism operable to change an attitude, orientation, and/or direction of flight of the kinetic projectile; and
      a steering actuator operable to control the steering mechanism; and
  a base system including:
    a projectile holder securing the kinetic projectile to the aerial vehicle and configured to selectively release the kinetic projectile;
    a target tracking system; and
    a projectile guidance system including a projectile tracking system and a projectile control system;
  wherein the base system is configured to:
    release the kinetic projectile from the projectile holder such that the kinetic projectile is driven toward a target by gravity;
    track the target using the target tracking system;
    track the released kinetic projectile using the projectile tracking system; and
    automatically control the onboard steering system of the kinetic projectile using the projectile control system to adjust a trajectory of the falling kinetic projectile to steer the kinetic projectile to the target.

37. A method for damaging a target, the method comprising:
providing a weaponized aerial vehicle including:
  an aerial vehicle; and
  a projectile delivery system mounted on the aerial vehicle for flight therewith, the projectile delivery system including:
    a kinetic projectile including:
      a projectile body; and
      an onboard steering system including:
        a steering mechanism operable to change an attitude, orientation, and/or direction of flight of the kinetic projectile; and
        a steering actuator operable to control the steering mechanism; and
    a base system including:
      a projectile holder securing the kinetic projectile to the aerial vehicle and configured to selectively release the kinetic projectile;
      a target tracking system; and
      a projectile guidance system including a projectile tracking system and a projectile control system; and
using the base system to:
  release the kinetic projectile from the projectile holder such that the kinetic projectile is driven toward a target by gravity;
  track the target using the target tracking system;
  track the released kinetic projectile using the projectile tracking system; and
  automatically control the onboard steering system of the kinetic projectile using the projectile control system to adjust a trajectory of the falling kinetic projectile to steer the kinetic projectile to the target.

* * * * *